United States Patent
Heath et al.

(10) Patent No.: US 10,059,039 B2
(45) Date of Patent: Aug. 28, 2018

(54) APPARATUS, SYSTEM AND METHOD FOR ISOLATING A CONTROLLED ENVIRONMENT FOR CURE PROCESS CONTROL

(71) Applicant: The Boeing Company, Chicago, IL (US)

(72) Inventors: Jonathan C. Heath, Charleston, SC (US); Robert J. Schumann, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 228 days.

(21) Appl. No.: 15/011,434

(22) Filed: Jan. 29, 2016

(65) Prior Publication Data

US 2017/0217050 A1 Aug. 3, 2017

(51) Int. Cl.
  *B29C 33/02* (2006.01)
  *B29C 35/00* (2006.01)
  *B29C 33/04* (2006.01)
  *B29C 35/02* (2006.01)

(52) U.S. Cl.
  CPC .............. *B29C 33/02* (2013.01); *B29C 33/04* (2013.01); *B29C 35/002* (2013.01); *B29C 35/02* (2013.01); *B29C 35/0288* (2013.01); *B29C 2033/042* (2013.01)

(58) Field of Classification Search
  CPC ..... B29C 33/02; B29C 35/0288; B29C 33/04; B29C 35/02; B29C 35/002; B29C 2033/042; B29C 39/026; B29C 35/00; B29C 35/04; B29C 33/046; B29C 33/048; B64D 45/02; F16B 33/004; F16B 37/14; B29L 2031/26

See application file for complete search history.

(56) References Cited

U.S. PATENT DOCUMENTS

| | | | | |
|---|---|---|---|---|
| 2,579,898 | A | * 12/1951 | Brucker | .................. B29C 33/04 164/338.1 |
| 3,526,694 | A | * 9/1970 | Lemelson | ......... B29C 45/14336 101/170 |
| 4,780,262 | A | * 10/1988 | VonVolkli | ............. B29C 70/342 264/101 |
| 5,345,397 | A | 9/1994 | Handel et al. | |
| 7,245,985 | B2 | 7/2007 | Magill et al. | |
| 7,433,755 | B2 | 10/2008 | Magill et al. | |

(Continued)

*Primary Examiner* — Matthew J Daniels
*Assistant Examiner* — Leith S Shafi

(57) ABSTRACT

An apparatus, system and method for isolating a controlled environment for cure process control of application and cure of one or more curable compounds to a structure. The apparatus has an end effector of an involute conformal mold having a mold body shaped to provide a shroud over an area covered with the one or more curable compounds on the structure, to isolate the area and the controlled environment. The mold body has an exterior surface, and an interior surface with a cavity profile corresponding to a desired curable compound shape. The mold body has one or more ports, and a plurality of involute channels with spiral flow paths. The involute channels include outer channel(s) having an outer path profile for regenerative heat transfer to the curable compound(s), and include inner channel(s) having an inner path profile for convective and radiative heat transfer to the curable compound(s).

20 Claims, 19 Drawing Sheets

(56) References Cited

U.S. PATENT DOCUMENTS

| | | | |
|---|---|---|---|
| 7,967,587 B2* | 6/2011 | Bradley | B05C 9/14 |
| | | | 249/157 |
| 2007/0166481 A1 | 7/2007 | Stirniman et al. | |
| 2010/0170659 A1* | 7/2010 | Maguire | B29B 13/021 |
| | | | 165/104.19 |
| 2013/0223951 A1* | 8/2013 | Bessho | B64D 45/02 |
| | | | 411/337 |
| 2016/0230801 A1* | 8/2016 | Dobbin | F16B 37/14 |

* cited by examiner

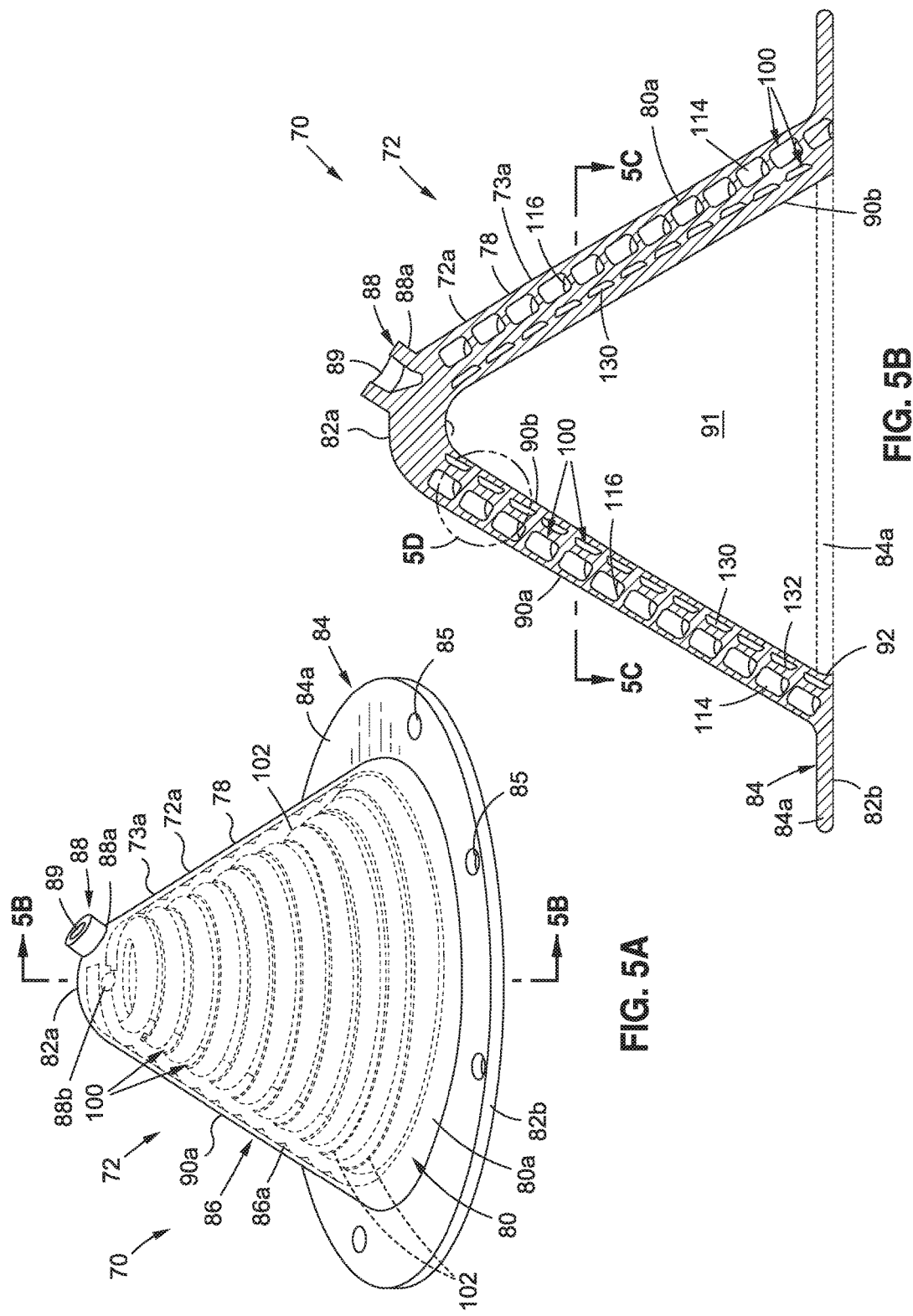

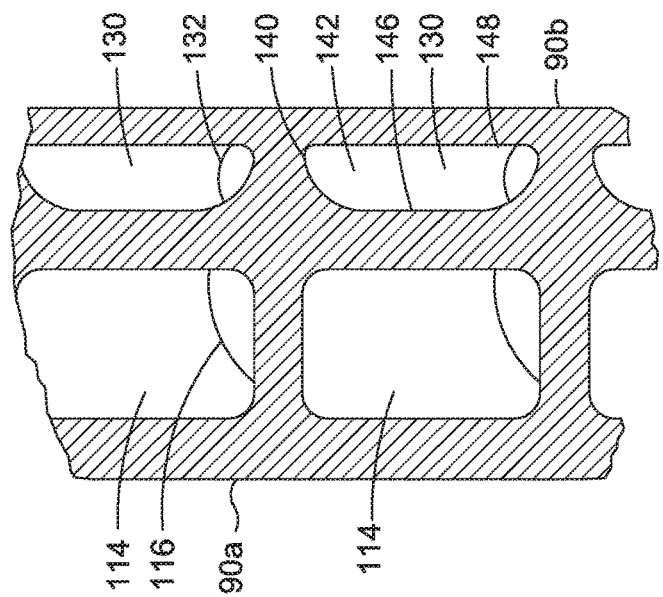
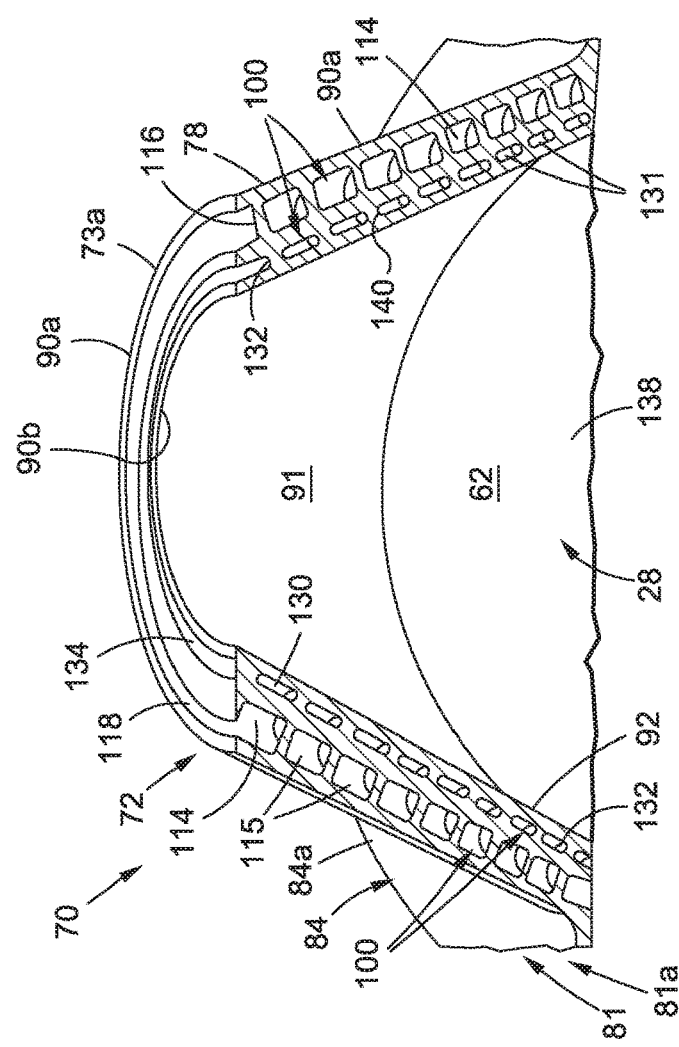

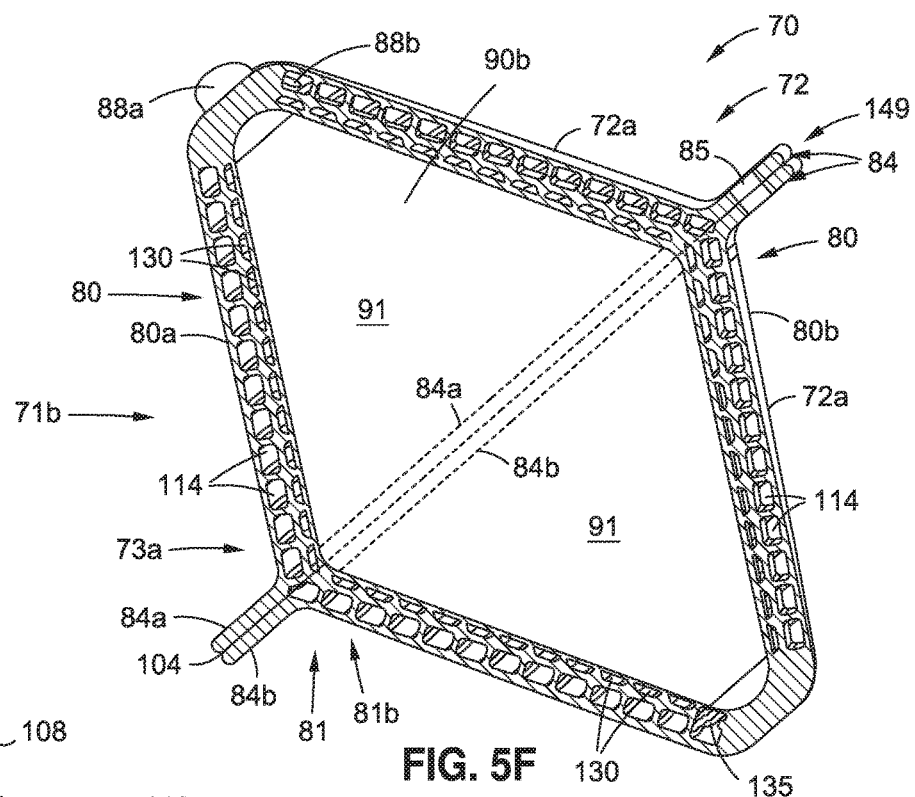
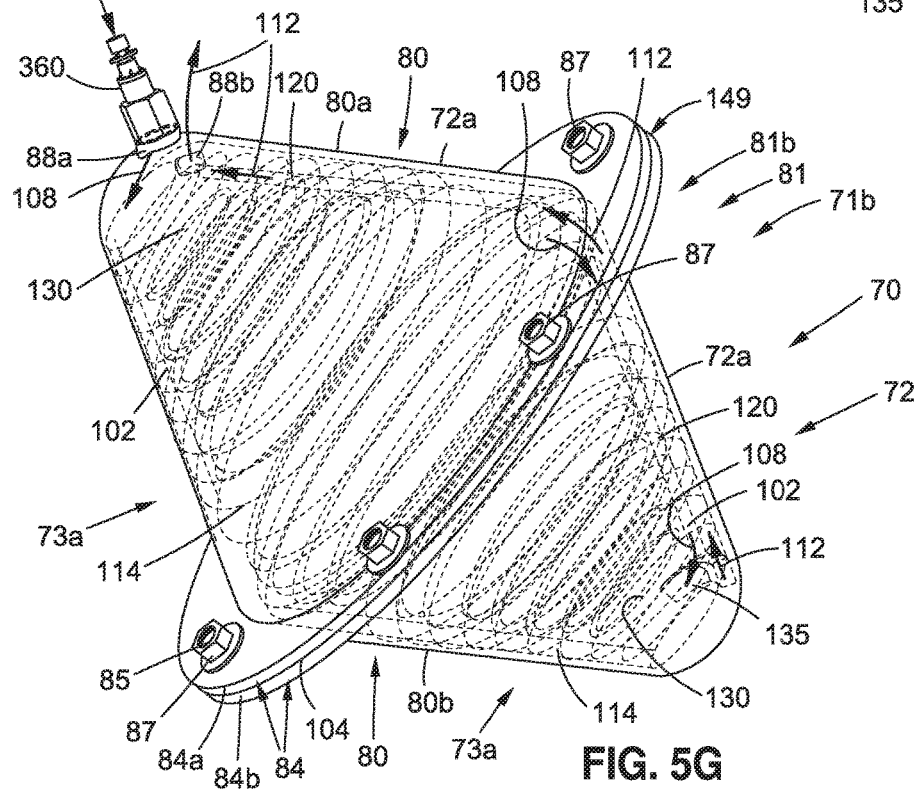
FIG. 5F
FIG. 5G

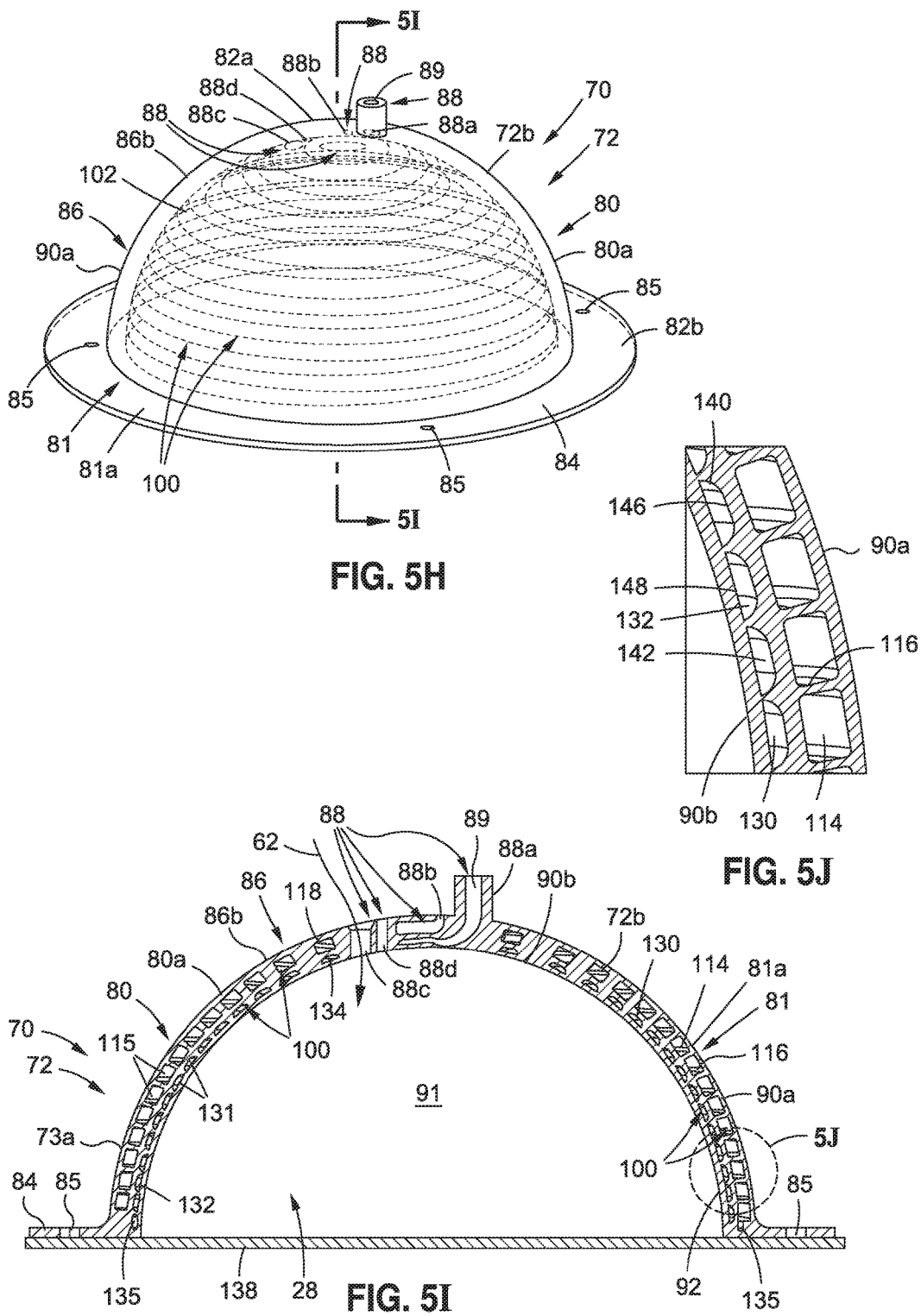

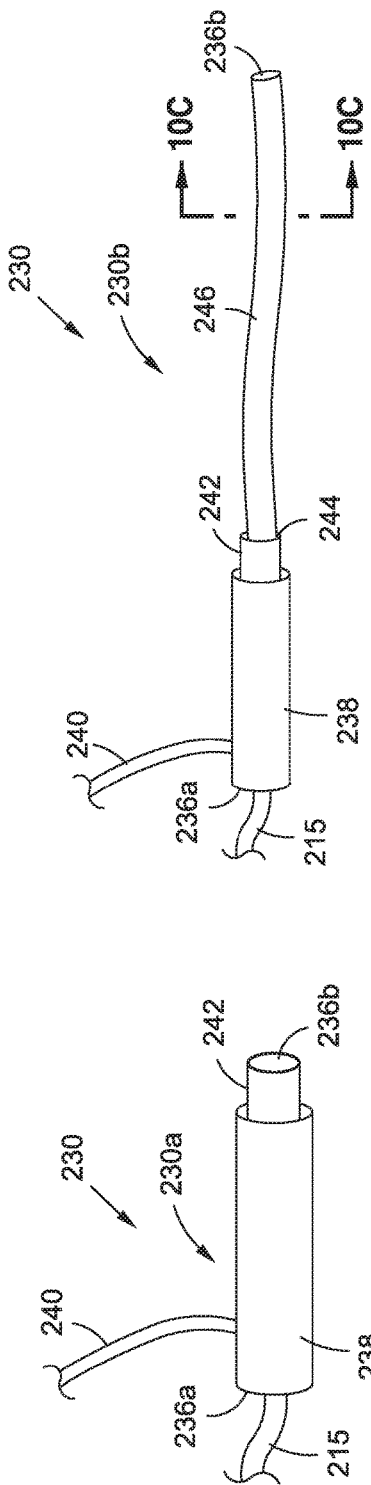
FIG. 10B
FIG. 10A
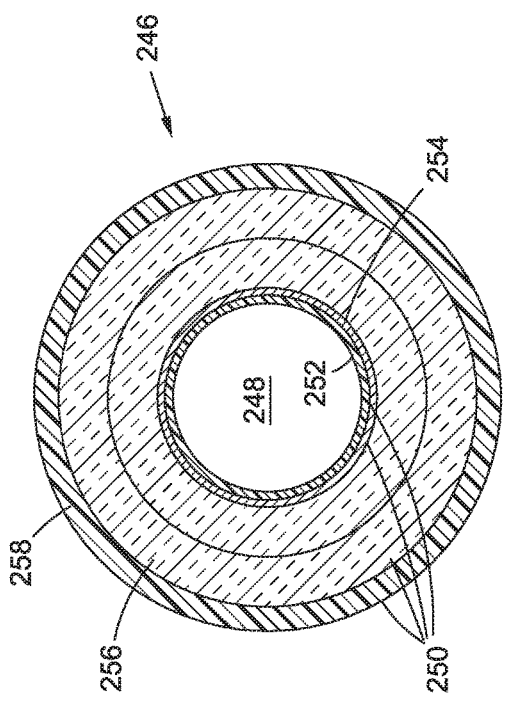
FIG. 10C

APPARATUS, SYSTEM AND METHOD FOR ISOLATING A CONTROLLED ENVIRONMENT FOR CURE PROCESS CONTROL

BACKGROUND

1) Field of the Disclosure

The disclosure relates generally to apparatuses, systems and methods for cure process control of curable compounds, and more particularly, to improved apparatuses, systems and methods for isolating a controlled environment for cure process control of the application and cure of curable compounds.

2) Description of Related Art

Application of curable compounds, such as sealants, adhesives, and paints, to component parts and structures for aircraft, spacecraft, rotorcraft, watercraft, or other vehicles or structures is subject to wide variation in the curing cycle and variation in the cured material properties, based on environmental conditions present when the curable compounds are applied to the component parts and structures and cured. Such wide variation, in turn, may introduce variability into the production system, which may result in increased cost, uncertain quality, and a restricted manufacturing rate.

In addition, the application of curable compounds, such as sealants, adhesives, and paints, to component parts and structures for aircraft, spacecraft, rotorcraft, watercraft, or other vehicles or structures, may need to be applied and cured in a classified environment and be class one, division one ("C1D1") compliant. "C1D1 compliant" means that the process, such as the cure process, must effectively meet the standards set forth for use of electrical equipment in hazardous areas by NFPA 70 (i.e., the National Electrical Code (NEC), which is a regionally adoptable standard for the safe installation of electrical wiring and equipment in the United States, and is part of the National Fire Codes series published by the National Fire Protection Association (NFPA), a private trade association).

Variability inherent to known processes for applying and curing curable compounds in a classified environment means that any given sealant application may require an indeterminate amount of time for completion, and the cure may be of uncertain quality on completion (e.g. uneven cure profile may lead to difficulty with adhesion). Such uncertainty may affect the stabilization and control of the production process.

Known systems and methods exist for cure process control of curable compounds in a classified environment or area. For example, such known systems and methods may include heating an entire classified area, using pneumatic energy vortex heaters, using heater bars, or using heater blankets. However, heating an entire classified area may be untenable for a manufacturing heating rate due to an OSHA (Occupational Safety and Health Administration) requirement of a maximum 80 degrees Fahrenheit working temperature for employees. The cure temperature for curable compounds may be higher than the maximum 80 degrees Fahrenheit.

Moreover, using pneumatic energy vortex heaters may be untenable due to an OSHA employee noise exposure requirement of a maximum sound pressure level (SPL) of 85 decibels without auditory protection. The sound pressure level (SPL) of the pneumatic energy vortex heater equipment used for the cure process may be higher than the maximum sound pressure level (SPL) of 85 decibels.

In addition, the use of heater bars may not be C1D1 compliant, no method of conveyance may be available for remote generation, and heater bars may not easily be adapted to tight spaces or convoluted surfaces for which curable compounds need to be applied to and cured. Further, the use of heater blankets may not be C1D1 compliant, no method of conveyance may be available for remote generation, and curable compounds may not be able to have a blanket applied until tack-free, which may take an indeterminate amount of time to become tack-free without use of a process control heater.

Accordingly, there is a need in the art for an improved apparatus, system, and method for isolating a controlled environment for cure process control of application and cure of curable compounds to a structure that are portable, flexible, adaptable, low profile, operate nearly independently of external environmental conditions, and that provide advantages over known devices, systems and methods.

SUMMARY

Example implementations of this disclosure provide an improved apparatus, system, and method for isolating a controlled environment for cure process control of application and cure of curable compounds to a structure. As discussed in the below detailed description, embodiments of the improved apparatus, system, and method may provide significant advantages over known devices, systems, and methods.

In one embodiment there is provided an apparatus for isolating a controlled environment for cure process control of application and cure of one or more curable compounds to a structure. The apparatus comprises an end effector comprising an involute conformal mold. The involute conformal mold has a mold body shaped to provide a shroud over an area covered with the one or more curable compounds on the structure, to isolate the area and to isolate the controlled environment for cure process control of the application and cure of the one or more curable compounds.

The mold body comprises an exterior surface and an interior surface. The interior surface has a cavity profile corresponding to a desired curable compound shape.

The mold body further comprises one or more ports formed in the exterior surface of the mold body. The mold body further comprises a plurality of involute channels with spiral flow paths.

The plurality of involute channels comprise one or more outer channels. Each outer channel has an outer path profile configured for regenerative heat transfer to the one or more curable compounds. The plurality of involute channels further comprise one or more inner channels. Each inner channel has an inner path profile configured for convective heat transfer and radiative heat transfer to the one or more curable compounds.

In another embodiment there is provided a system for isolating a controlled environment for cure process control of application and cure of one or more curable compounds to a structure. The system comprises a cure process control system. The cure process control system comprises a power system, and a process controller system coupled to the power system. The cure process control system further comprises one of a humidity control system, a temperature control system, or an integrated humidity control and temperature control system, coupled to the process controller system and the power system.

The cure process control system further comprises an inerted energy conditioning and conveyance assembly having a first end and a second end. The first end is coupled via a connector element to one of the humidity control system, the temperature control system, or the integrated humidity control and temperature control system.

The system further comprises one or more end effectors. Each end effector is configured for independent coupling to the second end of the inerted energy conditioning and conveyance assembly. Each end effector is shaped to provide a shroud over the area covered with the one or more curable compounds on the structure, to isolate the area and to isolate the controlled environment for cure process control of the application and cure of the one or more curable compounds.

The cure process control system independently controls one or more of a controlled humidity, a controlled air pressure, a controlled temperature, a controlled start time, and a controlled duration for each of the one or more end effectors. The cure process control system also independently controls one or more cure cycles of the one or more curable compounds simultaneously.

In another embodiment there is provided a method for isolating a controlled environment for cure process control of application and cure of one or more curable compounds to a structure. The method comprises the step of connecting an end effector to an inerted energy conditioning and conveyance assembly of a cure process control system. The inerted energy conditioning and conveyance assembly has at least one inline heater. The cure process control system comprises one of a humidity control system, a temperature control system, or an integrated humidity control and temperature control system, coupled to a process controller system and to a power system.

The method further comprises the step of applying the one or more curable compounds to an area of the structure. The method further comprises the step of using the end effector to isolate the area covered with the one or more curable compounds, and to isolate the controlled environment for the cure process control of the application and cure of the one or more curable compounds.

The method further comprises the step of using the cure process control system to control one or more of a controlled humidity, a controlled air pressure, a controlled temperature, a controlled start time, and a controlled duration, for the end effector. The method further comprises the step of using the cure process control system to control one or more cure cycles of the one or more curable compounds.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 5A is an illustration of a perspective view of an embodiment of a first portion of an apparatus of the disclosure in the form of a molding end effector having a cone shape;

FIG. 5B is an illustration of a cross-sectional front view of the first portion of the apparatus of FIG. 5A, taken along cross-section lines 5B-5B of FIG. 5A;

FIG. 5C is an illustration of a cross-sectional and cutaway front perspective view of the first portion of the apparatus of FIGS. 5A-5B, taken along cross-section lines 5C-5C of FIG. 5B;

FIG. 5D is an illustration of an enlarged sectional view of the inner and outer channels of the circle 5D of FIG. 5B;

FIG. 5F is an illustration of the cross-sectional front view of the apparatus of FIG. 5E in a joined position;

FIG. 5G is an illustration of a perspective view of the apparatus of FIG. 5F, where the first portion and the second portion are attached together with attachment elements, and the cross-flow paths and inner/outer channel connection are shown;

FIG. 5H is an illustration of a perspective view of another embodiment of a first portion of an apparatus of the disclosure in the form of a molding end effector having a dome shape;

FIG. 5I is an illustration of a cross-sectional front view of the first portion of the apparatus of FIG. 5H, taken along cross-section lines 5I-5I of FIG. 5H;

FIG. 5J is an illustration of a enlarged sectional view of the inner and outer channels of the circle 5J of FIG. 5I;

FIG. 10A is an illustration of a schematic diagram of an embodiment of an inerted energy conditioning and conveyance assembly in the form of a non-classified conditioning and conveyance assembly that may be used in embodiments of the system of the disclosure;

FIG. 10B is an illustration of a schematic diagram of another embodiment of an inerted energy conditioning and conveyance assembly in the form of a classified conditioning and conveyance assembly that may be used in embodiments of the system of the disclosure;

FIG. 10C is an illustration of a cross-sectional view of an insulated air line of the classified conditioning and conveyance assembly of FIG. 10B, taken along cross-section lines 10C-10C of FIG. 10B;

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
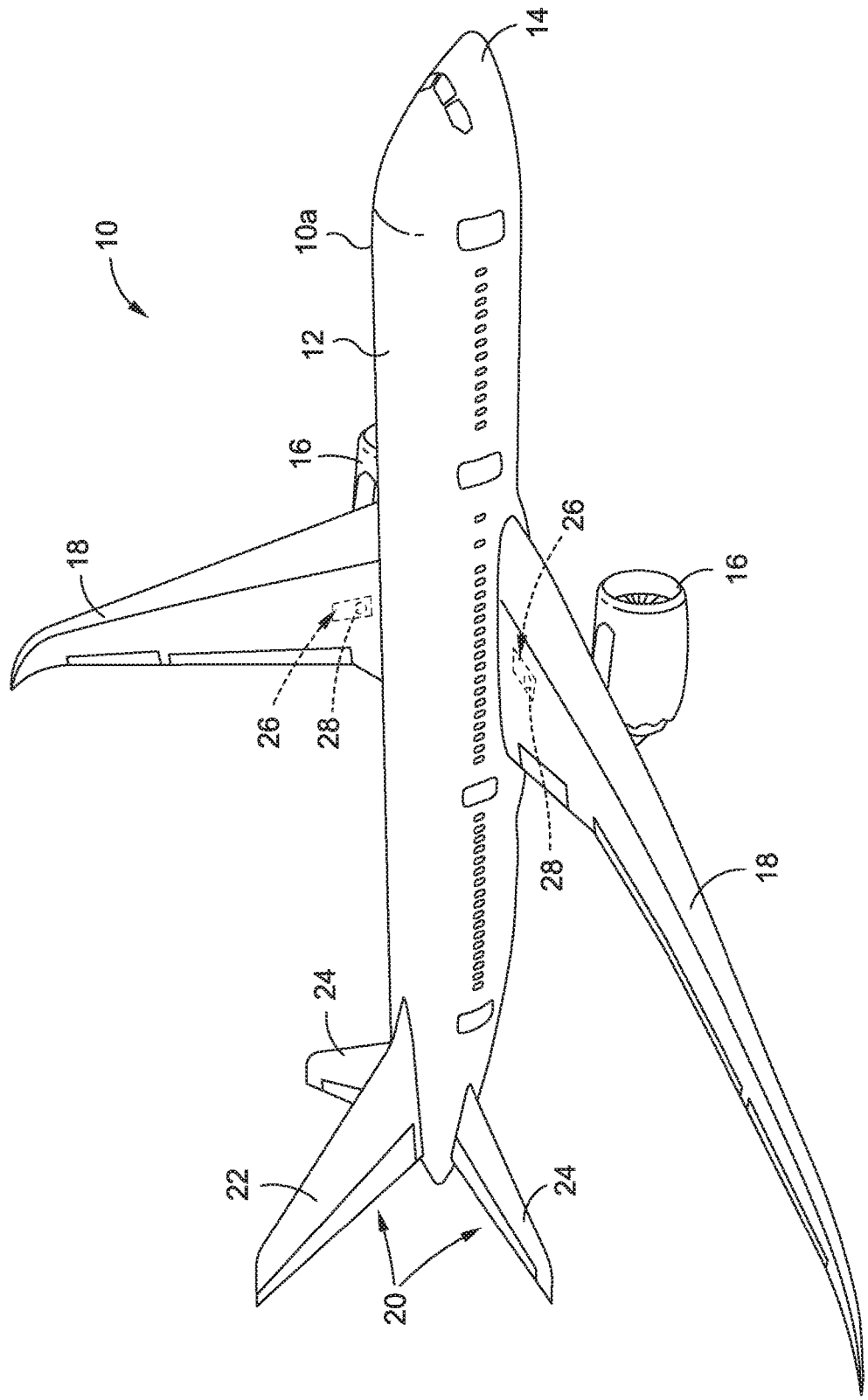
FIG. 1 is an illustration of a perspective view of an air vehicle having one or more structures for which a curable compound may be applied and cured with one or more embodiments of an apparatus, a system and a method of the disclosure.

Now referring to the Figures, FIG. 1 is an illustration of a perspective view of an air vehicle 10, such as in the form of aircraft 10a, having one or more structures 26 for which a curable compound 62 (see FIG. 6) may be applied and cured with one or more embodiments of an apparatus 70 (see FIG. 4), a system 150 (see FIG. 6), and a method 400 (see FIG. 14) of the disclosure. As shown in FIG. 1, the air vehicle 10, such as in the form of aircraft 10a, comprises a fuselage 12, a nose 14, engines 16, wings 18, and a tail 20 comprising a vertical stabilizer 22 and horizontal stabilizers 24.

As further shown in FIG. 1, the air vehicle 10, such as in the form of aircraft 10a, comprises one or more structures 26 having one or more areas 28 for which one or more curable compounds 62 (see FIG. 6) may be applied and cured, as disclosed herein. The one or more structures 26 may comprise aircraft structural parts 26a (see FIG. 6), such as parts of the wings 18 (see FIG. 1) and parts of the fuselage 12 (see FIG. 1), for example, access panels 274 (see FIG. 11), center wing tanks 274 (see FIG. 6), and other suitable aircraft structural parts 26a (see FIG. 6).

In an exemplary embodiment, the structure 26 (see FIG. 1) comprises aircraft structural parts on the air vehicle 10 (see FIG. 1), such as aircraft 10a (see FIG. 1). In other embodiments (not shown), the structure 26 (see FIG. 6) may comprise a rotorcraft structural part on a rotorcraft, a spacecraft structural part on a spacecraft, a watercraft structural part on a watercraft, an automobile structural part an automobile, a truck structural part on a truck, or another suitable structure 26 for which curable compounds 62 may be applied and cured.

Figure 2:
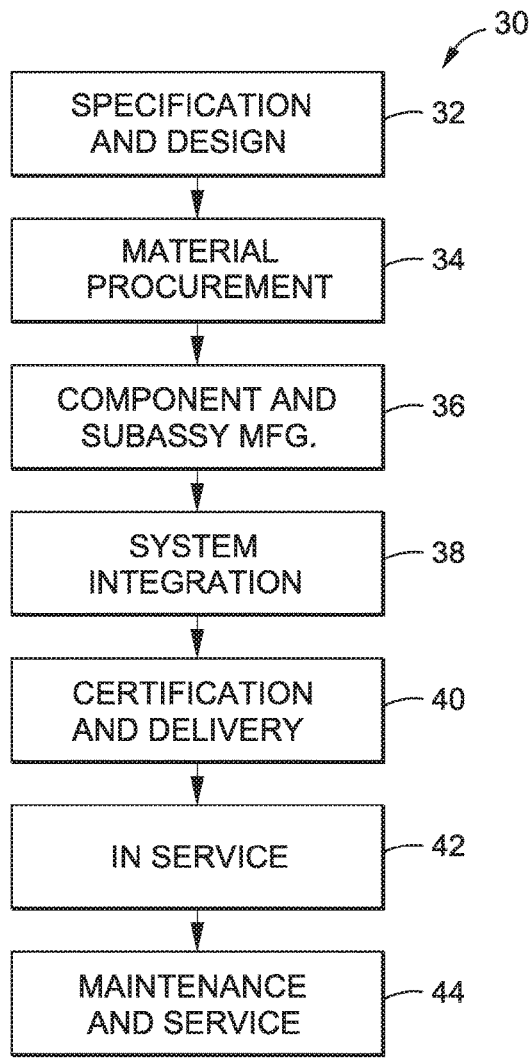
FIG. 2 is an illustration of a flow diagram of an embodiment of an aircraft manufacturing and service method.
Figure 3:
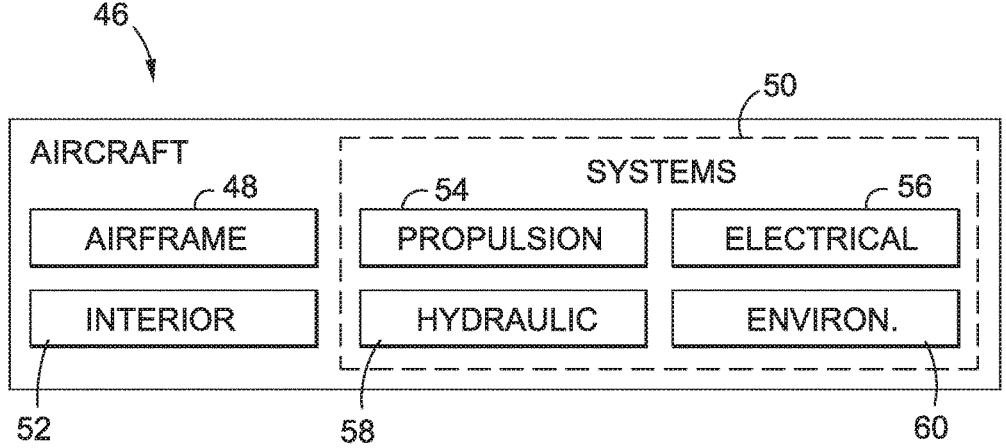
FIG. 3 is an illustration of a functional block diagram of an embodiment of an aircraft.

FIG. 2 is an illustration of a flow diagram of an embodiment of an aircraft manufacturing and service method 30. FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Figure 4:
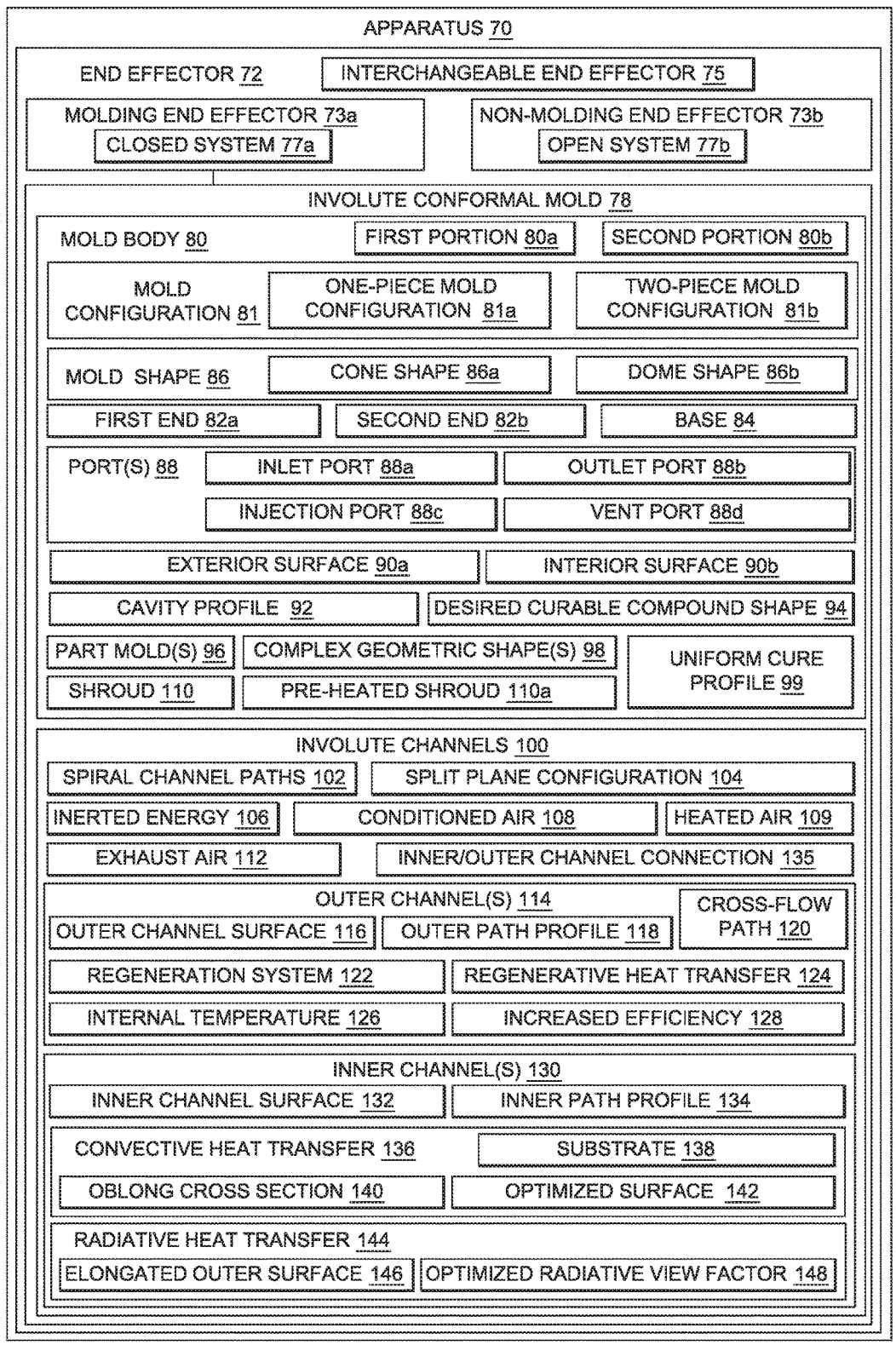
FIG. 4 is an illustration of a functional block diagram of exemplary embodiments of an apparatus of the disclosure.

Now referring to FIG. 4, FIG. 4 is an illustration of a functional block diagram of exemplary embodiments of an apparatus 70 of the disclosure. For example, in an embodiment, there is provided the apparatus 70 (see FIG. 4) for isolating a controlled environment 74 (see FIG. 6) for cure process control 76 (see FIG. 6) of the application and cure of one or more curable compounds 62 (see FIG. 6) to a structure 26 (see FIGS. 1, 6). One or more areas 28 (see FIGS. 1, 6) of the structure 26 (see FIGS. 1, 6) are preferably covered or configured to be covered with the one or more curable compounds 62 (see FIG. 6).

The one or more curable compounds 62 (see FIG. 6) may comprise one or more of sealants 64 (see FIG. 6) such as polysulfide sealants or other suitable sealants, adhesives 66 (see FIG. 6), room temperature vulcanization (RTV) silicones 67 (see FIG. 6), paints 68 (see FIG. 6), and other suitable curable compounds. The one or more curable compounds 62 (see FIG. 6) may be applied to the area 28 (see FIG. 1) to be covered or coated, such as a substrate 138 (see FIGS. 4, 5C), via fillet seal, injection seal grommet, cap seal, or another suitable application method or device.

As shown in FIG. 4, the apparatus 70 comprises an end effector 72. The end effector 72 (see FIG. 4) is preferably an interchangeable end effector 75 (see FIG. 4). The end effector 72 (see FIG. 4) may comprise a molding end effector 73a (see FIG. 4) or a non-molding end effector 73b (see FIG. 4). The molding end effector 73a (see FIG. 4) may be used in a closed system 77a (see FIG. 4) not open to the environment, such as, for example, a form-molding shroud 111c (see FIG. 6). The non-molding end effector 73b (see FIG. 4) may be used in an open system 77b (see FIG. 4) which is open to the environment, or vents to the environment, but is controlled with, for example, an open-flow shroud 111a (see FIGS. 5K, 6), a box enclosure shroud 111b (see FIGS. 5L, 6), or another suitable shroud configuration 111 (see FIG. 6).

In one embodiment, as shown in FIG. 4, the molding end effector 73a may comprise an involute conformal mold 78. As used herein, "involute" means curved spirally. Preferably, the involute conformal mold 78 (see FIG. 4) is interchangeable. As shown in FIG. 4, the end effector 72, such as in the form of the molding end effector 73a, for example, the involute conformal mold 78, has a mold body 80. The mold body 80 (see FIG. 4) is preferably shaped to provide a shroud 110 (see FIG. 4) over the area 28 (see FIG. 6) covered or to be covered with the curable compound 62 (see FIG. 6), so as to isolate the area 28 (see FIG. 6) and isolate the controlled environment 74 (see FIG. 6) for cure process control 76 (see FIG. 6) of the application and cure of the one or more curable compounds 62 (see FIG. 6).

The end effector 72 (see FIG. 4), such as in the form of the involute conformal mold 78 (see FIG. 4), is preferably protective and provides the shroud 110 (see FIG. 4) that envelops and surrounds the one or more curable compounds 62 (see FIG. 6), so as to protect the curable compound 62 (see FIG. 6) against damage, unwanted contact, and foreign object debris intrusion.

Figure 5E:
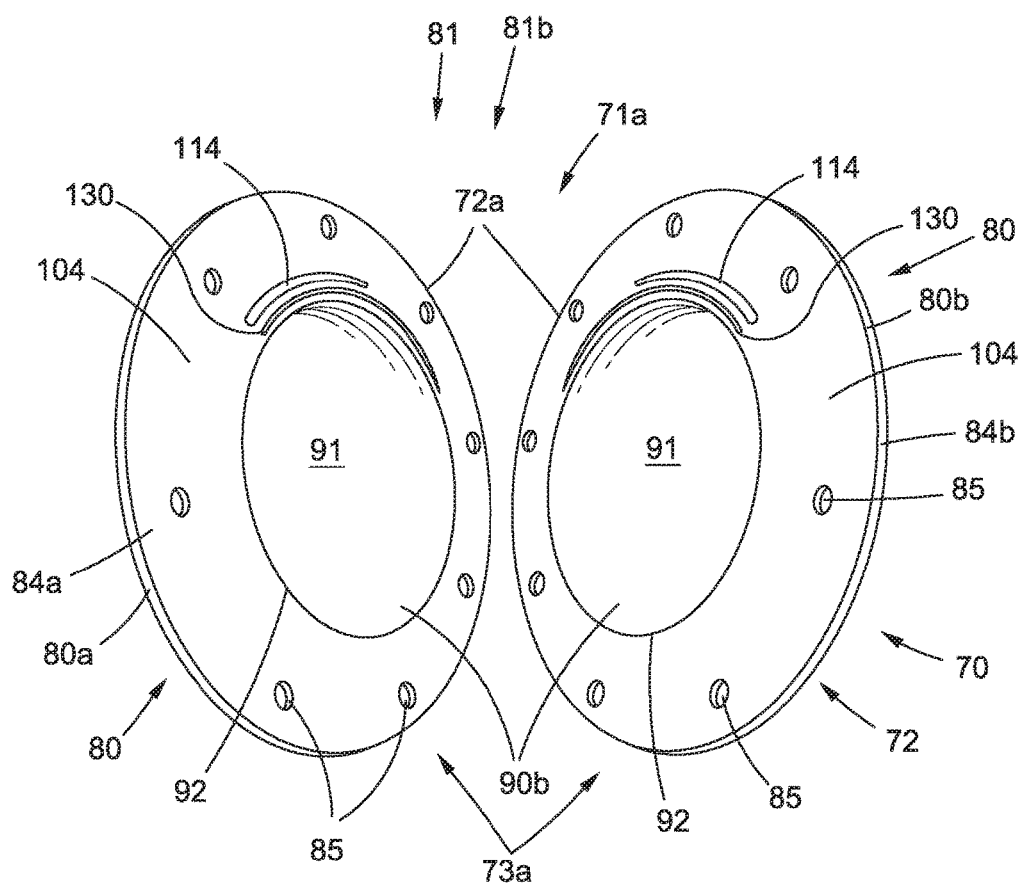
FIG. 5E is an illustration of a bottom perspective view of an apparatus of the disclosure with a two-piece mold configuration in an unjoined position.

As shown in FIGS. 4 and 5A, the mold body 80 comprises a first end 82a, a second end 82b, a base 84, an exterior surface 90a, and an interior surface 90b. The mold body 80 (see FIG. 4) may comprise a mold configuration 81 (see FIG. 4) comprising one of a one-piece mold configuration 81a (see FIG. 4), a two-piece mold configuration 81b (see FIG. 4) with a split plane configuration 104 (see FIG. 4), or another suitable mold configuration 81 (see FIG. 4). For example, in one embodiment, the mold body 80 (see FIGS. 4, 5C, 5H) may comprise a first portion 80a (see FIGS. 4, 5C, 5H) and comprise a one-piece mold configuration 81a (see FIGS. 4, 5C, 5H). In another embodiment, the mold body 80 (see FIGS. 4, 5A, 5F-5G) may comprise a first portion 80a (see FIGS. 4, 5A, 5F-5G), or first half, of the mold body 80 (see FIGS. 4, 5A, 5F-5G) joined or attached in an opposed relationship 149 (see FIGS. 5F-5G) to a second portion 80b (see FIGS. 4, 5F-5G), or second half, of the mold body 80 (see FIGS. 4, 5F) and comprise a two-piece mold configuration 81b (see FIGS. 4, 5F-5G). The interiors of the first portion 80a (see FIGS. 4, 5B, 5E, 5I) and the second portion 80b (see FIGS. 4, 5E) preferably each comprise a hollow cavity 91 (see FIGS. 4, 5B, 5E, 5I) with a cavity profile 92 (see FIGS. 4, 5B, 5E, 5I). The mold body 80 (see FIGS. 4, 5A) preferably has a mold shape 86 (see FIGS. 4, 5A). The mold body 80 (see FIGS. 4, 5A, 5H) may have a mold shape 86 (see FIGS. 4, 5A, 5H) comprising a cone shape 86a (see FIGS. 4, 5A), a dome shape 86b (see FIGS. 4, 5H), or another suitable shape.

As further shown in FIGS. 4 and 5A, the mold body 80 preferably has one or more ports 88 that may be formed in the exterior surface 90a or another portion of the mold body 80. The one or more ports 88 (see FIG. 4) may comprise one or more inlet ports 88a (see FIGS. 4, 5A), one or more outlet ports 88b (see FIGS. 4, 5A), one or more injection ports 88c (see FIGS. 4, 5G-5H), and/or one or more vent ports 88d (see FIGS. 4, 5G-5H), or other suitable ports 88 (see FIG. 4). The one or more ports 88 (see FIG. 4) may be formed in and through both the exterior surface 90a (see FIGS. 4, 5H) and the interior surface 90b (see FIGS. 4, 5H) of the mold body 80 (see FIGS. 4, 5H), in and through the exterior surface 90a (see FIGS. 4, 5A-5B) of the mold body 80 (see FIGS. 4, 5A-5B), or formed in another suitable way.

The one or more ports 88 (see FIG. 4) are preferably configured for one or more of, input of the curable compound(s) 62 (see FIG. 6) into the end effector 72 (see FIG. 4), input of conditioned air 108 (see FIGS. 4, 5G), such as heated air 109 (see FIG. 4), into the end effector 72 (see FIGS. 4, 5G), minimized output of exhaust air 112 (see FIGS. 4, 5G), and other suitable input or output of gases or fluids.

The interior surface 90b (see FIGS. 4, 5B) preferably has a cavity profile 92 (see FIGS. 4, 5B) configured to correspond to or match a desired curable compound shape 94 (see FIG. 4), such as the outer profile of the desired curable compound shape 94, so that the involute conformal mold 78 may be used as a forming mold.

The end effector 72 (see FIG. 4), such as in the form of the molding end effector 73a (see FIG. 4), for example, the involute conformal mold 78 (see FIG. 4), is preferably form molding, and may be used in dual purpose as part molds 96 (see FIG. 4) for curable compounds 62 (see FIG. 6) with desired curable compound shapes 94 (see FIG. 4) or prescribed shapes. Compound injection, forming, and controlled curing may be managed with the end effector 72 (see FIG. 4) single part.

The end effector 72 (see FIG. 4), such as in the form of the molding end effector 73a, for example, the involute conformal mold 78 (see FIG. 4), is preferably conformal and conforms to complex geometric shapes 98 (see FIG. 4), while providing for a uniform cure profile 99 (see FIG. 4). The end effector 72 (see FIG. 4), such as in the form of the molding end effector 73a (see FIG. 4) comprising the involute conformal mold 78 (see FIG. 4), is preferably configured to conform in-situ to the one or more complex geometric shapes 98 (see FIG. 4) of the area 28 (see FIGS. 1, 6) of the structure 26 (see FIGS. 1, 6), while providing for uniform delivery of a conditioned environment.

As further shown in FIG. 4, the mold body 80 of the end effector 72, such as in the form of the molding end effector 73a, for example, the involute conformal mold 78, further comprises a plurality of involute channels 100 with spiral flow paths 102 that are preferably concentric. The plurality of involute channels 100 (see FIGS. 4, 5A) preferably comprise one or more outer channels 114 (see FIGS. 4, 5B). Each outer channel 114 (see FIGS. 4, 5B) has an outer path profile 118 (see FIGS. 4, 5C) configured for regenerative heat transfer 124 (see FIG. 4) to the one or more curable compounds 62 (see FIG. 6). The outer channel 114 (see FIGS. 5C, 5I) may comprise outer channel portions 115 (see FIGS. 5C, 5I). The plurality of involute channels 100 (see FIGS. 4, 5A) of the involute conformal mold 78 (see FIG. 4) are preferably configured to transfer inerted energy 106 (see FIG. 4) to the one or more curable compounds 62 (see FIG. 6) from conditioned air 108 (see FIG. 4) that is input into the end effector 72 (see FIG. 4), in order to leverage a regeneration system 122 (see FIG. 4) to maintain internal temperature 126 (see FIG. 4) in adverse conditions.

As used herein, "inerted energy" means non-volatile energy, and as disclosed herein, the heated air lines, such as heated pneumatic air lines, transport inerted energy. As used herein, "regenerative heat transfer" means heat transfer to and from a gas or fluid, which takes place in the absence of a heat source, and the regeneration system functions as a recuperator or counter-flow energy recovery heat exchanger within the supply and exhaustflow streams of the air flow in order to recover waste heat.

Thus, the end effector 72 (see FIG. 4), such as in the form of the molding end effector 73a (see FIG. 4), is preferably regenerative. Regeneration is achieved by means of the one or more outer channels 114 (see FIGS. 4, 5B) having one or more cross-flow paths 120 (see FIGS. 4, 5G) relative to the one or more inner channels 130 (see FIGS. 4, 5B). The spiral flow paths 102 (see FIGS. 4, 5G) closely follow the interior surface 90b (see FIGS. 4, 5F) of the end effector 72 (see FIGS. 4, 5F-5G), such as in the form of the molding end effector 73a (see FIGS. 4, 5F-5G), to most effectively transfer heat into the one or more curable compounds 62 (see FIGS. 5C, 6).

The end effector 72 (see FIG. 4), such as in the form of the molding end effector 73a (see FIG. 4), for example, the involute conformal mold 78 (see FIG. 4), may utilize a convoluted path such as spiral flow paths 102 (see FIG. 4) to take advantage of regenerative heat transfer 124 (see FIG. 4) for increased efficiency 128 (see FIG. 4). The spiral flow paths 102 (see FIG. 4) are preferably concentric and provide a pre-heated shroud 110a (see FIG. 4) of exhaust air 112 (see FIG. 4) over incoming conditioned air 108 (see FIG. 4) to limit transmission of waste heat into the surrounding environment, which may be controlled or classified itself.

The plurality of involute channels 100 (see FIGS. 4, 5A) preferably further comprise a plurality of inner channels 130 (see FIGS. 4, 5B). Each inner channel 130 (see FIGS. 4, 5B) has an inner path profile 134 (see FIGS. 4, 5C) that is specifically shaped and configured to provide optimal convective heat transfer 136 (see FIG. 4) and optimal radiative heat transfer 144 (see FIG. 4) into the one or more curable compounds 62 (see FIG. 6). The inner channel 130 (see FIGS. 5C, 5I) may comprise inner channel portions 131 (see FIGS. 5C, 5I). Each inner channel 130 (see FIGS. 4, 5D) preferably has an oblong cross section 140 (see FIGS. 4, 5D) with an optimized surface 142 (see FIGS. 4, 5D), such as an enlarged surface, that facilitates the convective heat transfer 136 (see FIG. 4) or provides an optimized surface for the convective heat transfer 136 (see FIG. 4) to take place. As used herein, "convective heat transfer" means heat transfer by mass motion of a fluid such as air or water, when the heated fluid is caused to move away from the source of heat, carrying energy with it. As used herein, "radiative heat transfer" means thermal radiation energy or heat transfer by the emission of electromagnetic waves which carry energy away from the emitting object.

Each inner channel 130 (see FIGS. 4, 5D) preferably further has an elongated outer surface 146 (see FIGS. 4, 5D) that provides an optimized radiative view factor 148 (see FIGS. 4, 5D), such as an enhanced view factor between the inner channel surface 132 (see FIG. 4) that is heated, and the interior surface 90b of the end effector 72, such as in the form of the involute conformal mold 78 (see FIG. 4). The one or more inner channels 130 (see FIG. 4) and the one or more outer channels 114 (see FIG. 4) meet or cross at an inner/outer channel connection 135 (see FIGS. 4, 5E, 5H).

As shown in FIGS. 4 and 5E-5F, the mold body 80 preferably has a split plane configuration 104 between the first portion 80a (see FIGS. 5E-5F) of the mold body 80 (see FIGS. 5E-5F) and the second portion 80b (see FIGS. 5E-5F) of the mold body 80 (see FIGS. 5E-5F), when the first portion 80a (see FIGS. 5E-5F) and the second portion 80b (see FIGS. 5E-5F) are joined or attached together, such as in an opposed relationship at their respective bases 84 (see FIGS. 5E-5F). Path profile varies along the length to optimally direct heat into a substrate 138 (see FIGS. 4, 5C) on the structure 26 (see FIGS. 1, 6), or into an area 28 (see FIG. 6) on the structure 26 (see FIGS. 1, 6). The outer path profile 118 (see FIG. 4) is near isotropic. The inner path profile 134 (see FIG. 4) maximizes convective heat transfer 136 (see FIG. 4) into the area 28 (see FIG. 5C), for example, a substrate 138 (see FIGS. 4, 5C) covered with the one or more curable compounds 62 (see FIG. 5C) and maintains an optimized radiative view factor 148 (see FIG. 4), such as an inward facing radiative view factor.

The end effector 72 (see FIG. 4), such as in the form of the molding end effector 73a, for example, an involute conformal mold 78 (see FIG. 4), is preferably a closed system 77a (see FIG. 4). For more highly controlled applications, the end effectors 72 (see FIG. 4) may utilize convective heat transfer 136 (see FIG. 4) or radiative heat transfer 144 (see FIG. 4) to the one or more curable compounds 62 (see FIG. 6) to isolate the controlled environment 74 (see FIG. 6) and a cure cycle 155 (see FIG. 6) from external air. The involute conformal mold 78 (see FIG. 4) is preferably interchangeable and used as an end effector 72 (see FIG. 4) in both the application of the curable compound 62 (see FIG. 6) and the cure cycle 155 (see FIG. 6) of the curable compound 62 (see FIG. 6).

When the end effector 72 (see FIG. 4), such as in the form of the molding end effector 73a, for example, the involute conformal mold 78 (see FIG. 4), is used in conjunction with the components of a cure process control system 152 (see FIG. 6), discussed in detail below, full control is achieved of the end effector 72 (see FIG. 4) part configuration, the area 28 (see FIGS. 1, 6) covered with the one or more curable compounds 62 (see FIG. 6), and cure process control 76 (see FIG. 6) of the application and cure of the one or more curable compounds 62 (see FIG. 6), nearly irrespective of the external environment.

Now referring to FIGS. 5A-5D, FIG. 5A is an illustration of a perspective view of an embodiment of the first portion 80a, or first half, of the apparatus 70 of the disclosure in the form of the end effector 72 comprising the molding end effector 73a, for example, such as the involute conformal mold 78, having a cone shape 86a. FIG. 5B is an illustration of a cross-sectional front view of the first portion 80a of the mold body 80 of the apparatus 70 of FIG. 5A, taken along cross-section lines 5B-5B of FIG. 5A. FIG. 5C is an illustration of a cross-sectional and cut-away front perspective view of the first portion 80a of the apparatus 70 of FIGS. 5A-5B, taken along cross-section lines 5C-5C of FIG. 5B. FIG. 5D is an illustration of an enlarged sectional view of the one or more inner channels 130 and the one or more outer channels 114 of the circle 5D of FIG. 5B.

FIGS. 5A-5C show the apparatus 70 in the form of the end effector 72 comprising the molding end effector 73a, for example, such as the involute conformal mold 78 with the mold body 80 having involute channels 100. Preferably, the molding end effector 73a (see FIG. 5A) is the involute conformal mold 78 (see FIG. 5A). As shown in FIGS. 5A-5B, the mold body 80 has a first end 82a, a second end 82b, and a base 84 at the second end 82b. The base 84 (see FIG. 5A) may have one or more locations 85 (see FIG. 5A) configured to receive one or more attachment elements 87 (see FIG. 5F) such as a fastener, bolt, screw, or other suitable attachment element 87, for example, in order to attach or join the first portion 80a (see FIGS. 5A, 5F), or first half, of the mold body 80 (see FIG. 5F) of the apparatus 70 (see FIG. 5F) molding end effector 73a (see FIG. 5F) to the second portion 80b (see FIG. 5F), or second half, of the mold body 80 (see FIG. 5F) of the apparatus 70 (see FIG. 5F) molding end effector 73a (see FIG. 5F). The base 84 (see FIGS. 5A, 5F) of the first portion 80a (see FIGS. 5A, 5F) may be joined to the base 84 (see FIGS. 5A, 5F) of the second portion 80b (see FIGS. 5A, 5F) and aligned in an opposing relationship 149 (see FIG. 5F) opposite each other.

In one embodiment, the apparatus 70 of FIGS. 5A-5D may comprise a first portion 80a of a two-piece mold configuration 81b (see FIG. 5G). Alternatively, the apparatus 70 of FIGS. 5A-5D may comprise a separate one-piece mold configuration 81a (see FIG. 5C).

As shown in FIG. 5A, the mold body 80 has a mold shape 86, such as, for example, in the form of a cone shape 86a. Alternatively, the mold body 80 may, have a mold shape 86, for example, in the form of a dome shape 86b (see FIG. 5G), or another suitable shape that provides a shroud 110 (see FIG. 4) over the area 28 (see FIGS. 1, 6) covered or to be covered with the one or more curable compounds 62 (see FIG. 6).

As shown in FIGS. 5A-5B, the mold body 80 has a port 88, such as in the form of an inlet port 88a, formed on and extending from the exterior surface 90a of the mold body 80. The inlet port 88a (see FIGS. 5A-5B) has a through opening 89 (see FIGS. 5A-5B) for connecting the end effector 72 (see FIGS. 5A-5B) to the inerted energy conditioning and conveyance assembly 230 (see FIGS. 10A-10B) of the cure process control system 152 (see FIG. 6). The inlet port 88a (see FIGS. 5A-5B) may be configured for one or more of, input of the one or more curable compounds 62 (see FIG. 6) into the end effector 72 (see FIGS. 5A-5B), input of conditioned air 108 (see FIGS. 4, 5G), such as heated air 109 (see FIG. 4), into the end effector 72 (see FIGS. 5A-5B), and other suitable input of fluids and gases. As further shown in FIG. 5A, the mold body has an outlet port 88b formed at the first end 82a and on the exterior surface 90a of the mold body 80.

As shown in FIGS. 5B-5C, the mold body 80 has an interior surface 90b, a hollow cavity 91, and a cavity profile 92 (see FIG. 5B) configured to correspond to or match a desired curable compound shape 94 (see FIG. 4), such as the outer profile of the desired curable compound shape 94 (see FIG. 4), so that the involute conformal mold 78 may be used as a forming mold.

As shown in FIG. 5A, the mold body 80 of the end effector 72, such as in the form of the involute conformal mold 78, comprises a plurality of involute channels 100 with spiral flow paths 102 that are preferably concentric. The plurality of involute channels 100 (see FIGS. 5A-5C) preferably comprise one or more outer channels 114 (see FIGS. 5B-5D). Each outer channel 114 (see FIGS. 5B-5D) has an outer channel surface 116 (see FIGS. 5B-5D) and an outer path profile 118 (see FIG. 5C) configured for regenerative heat transfer 124 (see FIG. 4) to the one or more curable compounds 62 (see FIG. 6).

The plurality of involute channels 100 (see FIGS. 5A-5C) preferably further comprise a plurality of inner channels 130 (see FIGS. 5B-5D). Each inner channel 130 (see FIGS. 5B-5D) has an inner channel surface 132 (see FIGS. 5B-5D) and an inner path profile 134 (see FIG. 5C) that is specifically shaped and configured to provide optimal convective heat transfer 136 (see FIG. 4) and optimal radiative heat transfer 144 (see FIG. 4) into the one or more curable compounds 62 (see FIG. 6).

As shown in FIG. 5C, the curable compound 62 may fill the volume between the interior surface 90b of the end effector 72 and the area 28 covered, such as the substrate 138. In filling this volume the curable compound 62 (see FIG. 5C) coats or covers the interface between this volume and the area 28 (see FIG. 5C) covered, such as the substrate 138 (see FIG. 5C). FIG. 5C is also exemplary of how the end effector 70 (see FIGS. 5H-5I) with a dome shape 86b (see FIG. 5H) may be used with a curable compound 62 (see FIGS. 5C, 6).

FIG. 5D shows an enlarged sectional view of the one or more inner channels 130 and one or more outer channels 114 of the circle 5D of FIG. 5B, where each inner channel 130 preferably has an oblong cross section 140 with an optimized surface 142, such as an enlarged surface, that facilitates the convective heat transfer 136 (see FIG. 4), or provides an optimized surface for the convective heat transfer 136 (see FIG. 4) to take place. As further shown in FIG. 5D, each inner channel 130 preferably has an elongated outer surface 146 that provides an optimized radiative view factor 148, such as an enhanced view factor between the inner channel surface 132 that is heated and the interior surface 90b (see FIGS. 5B-5C) of the end effector 72 (see FIGS. 5A-5C), such as in the form of the involute conformal mold 78 (see FIGS. 5A-5C). As shown in FIG. 5D, the one or more outer channels 114 are closer to the exterior surface 90a of the end effector 72 (see FIGS. 5A-5C) than the one or more inner channels 130, and the one or more inner channels 130 are closer to the interior surface 90b.

FIG. 5E is an illustration of a bottom perspective view of the apparatus 70 of the disclosure with a two-piece mold configuration 81b in an unjoined position 71a. FIG. 5F is an illustration of the cross-sectional front view of the apparatus 70 of FIG. 5E in a joined position 71b. FIG. 5G is an illustration of a perspective view of the apparatus 70 of FIG. 5F, where the first portion 80a and the second portion 80b are attached together in the joined position 71b, with attachment elements 87 through the locations 85, and form the two-piece mold configuration 81b. In one embodiment, the apparatus 70 of FIGS. 5E-5G may comprise a two-piece mold configuration 81b comprising the first portion 80a shown in FIGS. 5A-5D and an additional second portion 80b. Alternatively, the apparatus 70 of FIGS. 5E-5G may comprise a separate two-piece mold configuration 81b, if the embodiment of FIGS. 5A-5D is a separate one-piece mold configuration 81a (see FIG. 5C).

As shown in FIGS. 5E-5G, the mold body 80 preferably has a split plane configuration 104 between the first portion 80a and the second portion 80b of the mold body 80. FIG. 5E is an illustration of a bottom perspective view of the first portion 80a of FIGS. 5A-5B, and a second portion 80b of the apparatus 70, in an unjoined position 71a, prior to being joined together. As shown in FIG. 5E, the locations 85 for the attachment elements 87 (see FIG. 5G), and the outer channel 114 and inner channel 130 of the base 84a of the first portion 80a or first half are aligned with the locations 85 for the attachment elements 87 (see FIG. 5G) and the outer channel 114 and inner channel 130 of the base 84b of the second portion 80b or second half. As further shown in FIG. 5E, the first portion 80a and the second portion 80b each have the interior surface 90b, the hollow cavity 91, and the cavity profile 92, and together they may be joined to form the apparatus 70, such as the end effector 72, such as in the form of end effector 72a.

In one embodiment, FIG. 5F is an illustration of the cross-sectional front view of the apparatus 70 of the disclosure in the form of the end effector 72, such as molding end effector 73a, where the first portion 80a of the mold body 80 and the second portion 80b of the mold body 80, as shown in FIG. 5E, are joined together in a joined position 71b, and form a two-piece mold configuration 81b. FIG. 5F shows the split plane configuration 104 formed between the base 84a of the first portion 80a and the base 84b of the second portion 80b, which are positioned in an opposed relationship 149 with each other. FIG. 5F further shows the first portion 80a and the second portion 80b having the one or more outer channels 114, the one or more inner channels 130, locations 85 for attachment elements 87 (see FIG. 5G), a base 84, and a hollow cavity 91. The first portion 80a (see FIG. 5F) has the inlet port 88a (see FIG. 5F) and the outlet port 88b (see FIG. 5F), and the second portion 80b (see FIG. 5F) has the inner/outer channel connection 135 (see FIG. 5F) that connects the one or more outer channels 114 (see FIG. 5F) and the one or more inner channels 130 (see FIG. 5F) of both the first portion 80a (see FIG. 5F) and the second portion 80b (see FIG. 5F).

FIG. 5G further shows the cross-flow paths 120 and inner/outer channel connection 135. FIG. 5G further shows the split plane configuration 104 formed between the base 84a of the first portion 80a and the base 84b of the second portion 80b, which are positioned in the opposed relationship 149 with each other. FIG. 5G further shows the first portion 80a and the second portion 80b having the spiral flow paths 102 and the cross-flow paths 120. The first portion 80a (see FIG. 5G) has the inlet port 88a (see FIG. 5G) connected to a quick disconnect fitting 360, and has the outlet port 88b (see FIG. 5G). The second portion 80b (see FIG. 5G) has the inner/outer channel connection 135 (see FIG. 5G).

In this embodiment of the molding end effector 73a, as shown in FIG. 5G, with the mold body 80 having the first portion 80a and the second portion 80b, the inner/outer channel connection 135 is located in the second portion 80b of the molding end effector 73a with the two-piece mold configuration 81b. This embodiment may have a single continuous concentric spiral inner channel 130 (see FIG. 5G) and a single continuous concentric spiral outer channel 114 (see FIG. 5G). For example, with this embodiment, the conditioned air 108 (see FIGS. 4, 5G) enters the inlet port 88a (see FIG. 5G) on the first portion 80a (see FIG. 5G) at the beginning or start of the inner channel 130 (see FIG. 5G) of the first portion 80a (see FIG. 5G), flows through the full continuous. concentric, spiral length of the inner channel 130 (see FIG. 5G) of the first portion 80a (see FIG. 5G) and then through the full continuous, concentric, spiral length of the inner channel 130 (see FIG. 5G) of the second portion 80b (see FIG. 5G) to the inner/outer channel connection 135. The exhaust air 112 (see FIG. 5G) then flows back through the full continuous, concentric, spiral length of the outer channel 114 (see FIG. 5G) of the second portion 80b (see FIG. 5G) and then through the full continuous, concentric, spiral length of the outer channel 114 (see FIG. 5G) of the first portion 80a (see FIG. 5G), which then terminates at the outlet port 88b (see FIG. 5G) on the first portion 80a (see FIG. 5G), and then the exhaust air 112 (see FIG. 5G) flows out of the outlet port 88b (see FIG. 5G).

The two-piece mold configuration 81b (see FIG. 5G) of the molding end effector 73a shown in FIG. 5O is exemplary of how the first portion 80a and the second portion 80b may interface to form a complex geometric shape 98 (see also FIG. 4). When the molding end effector 73a (see FIG. 5O) with the two-piece mold configuration 81b (see FIG. 5G) is used, an area 28 (see FIG. 5C) to be covered such as on a substrate 138 (see FIG. 5C) and between the substrate 138 (see FIG. 5C) and the interior surface 90b of the molding end effector 73a, may intrude into the hollow cavity 91 (see FIGS. 5C, 5F) through part of the interface, or the molding end effector 73a may be used to form part molds 96 (see FIG. 4) that may later be adhered to the area 28 (see FIG. 5C), including the substrate 138 (see FIG. 5C).

FIG. 5H is an illustration of a perspective view of another embodiment of a first portion 80a of an apparatus 70 of the disclosure in the form of a molding end effector 73a having a mold shape 86 in the form of a dome shape 86b, and having a mold configuration 81, such as in the form of a one-piece mold configuration 81a. FIG. 5I is an illustration of a cross-sectional front view of the first portion 80a of the apparatus 70 of FIG. 5H taken along cross-section lines 5I-5I of FIG. 5H.

As shown in FIGS. 5H-5I, the molding end effector 73a has a mold body 80 with a first end 82a, a second end 82b, and a base 84 at the second end 82b. The base 84 (see FIG. 5H) may have one or more locations 85 (see FIGS. 5H-5I) configured to receive one or more attachment elements 87 (see FIG. 5F) such as a fastener, bolt, screw, or other suitable attachment element 87, for example, in order to attach or join the first portion 80a (see FIGS. 5H-5I), or half, of the mold body 80 (see FIGS. 5H-5I) of the apparatus 70 (see FIGS. 5H-5I) molding end effector 73a (see FIGS. 5H-5I) to a substrate 138 (see FIG. 5I). With this embodiment, only one part is used with the area 28 (see FIG. 5C) to be covered or the substrate 138 (see FIG. 5I).

As further shown in FIGS. 5H-5I, the mold body 80 has multiple ports 88, including an inlet port 88a, an outlet port 88b, an injection port 88c, and a vent port 88d. As shown in FIGS. 5H-5I, the inlet port 88a is formed on the mold body 80 and has a through opening 89 for connecting the end effector 72 to the inerted energy conditioning and conveyance assembly 230 (see FIGS. 10A-10B) of the cure process control system 152 (see FIG. 6). The inlet port 88a (see FIGS. 5H-5I) may be configured for input of conditioned air 108 (see FIG. 4), such as heated air 109 (see FIG. 4), into the end effector 72 (see FIGS. 5H-5I), and other suitable input of fluids or gases. As further shown in FIGS. 5H-5I, the outlet port 88b is formed at the first end 82a and on the exterior surface 90a of the mold body 80. The outlet port 88b (see FIGS. 5H-5I) may be configured for output of exhaust air 112 (see FIG. 4) or other fluids or gases out of the end effector 72 (see FIGS. 5H-5I).

As further shown in FIGS. 5H-5I, the injection port 88c is formed at the first end 82a and on the exterior surface 90a of the mold body 80. The injection port 88c (see FIGS. 5H-5I) may be configured for input of the one or more curable compounds 62 (see FIGS. 5I, 6) into the end effector 72 (see FIGS. 5H-5I). As further shown in FIGS. 5H-5I, the vent port 88d is formed at the first end 82a and on the exterior surface 90a of the mold body 80. The vent port 88c (see FIGS. 5H-5I) may be used in conjunction with the injection port 88c (see FIGS. 5H-5I) to vent exhaust air 112

Figure 6:
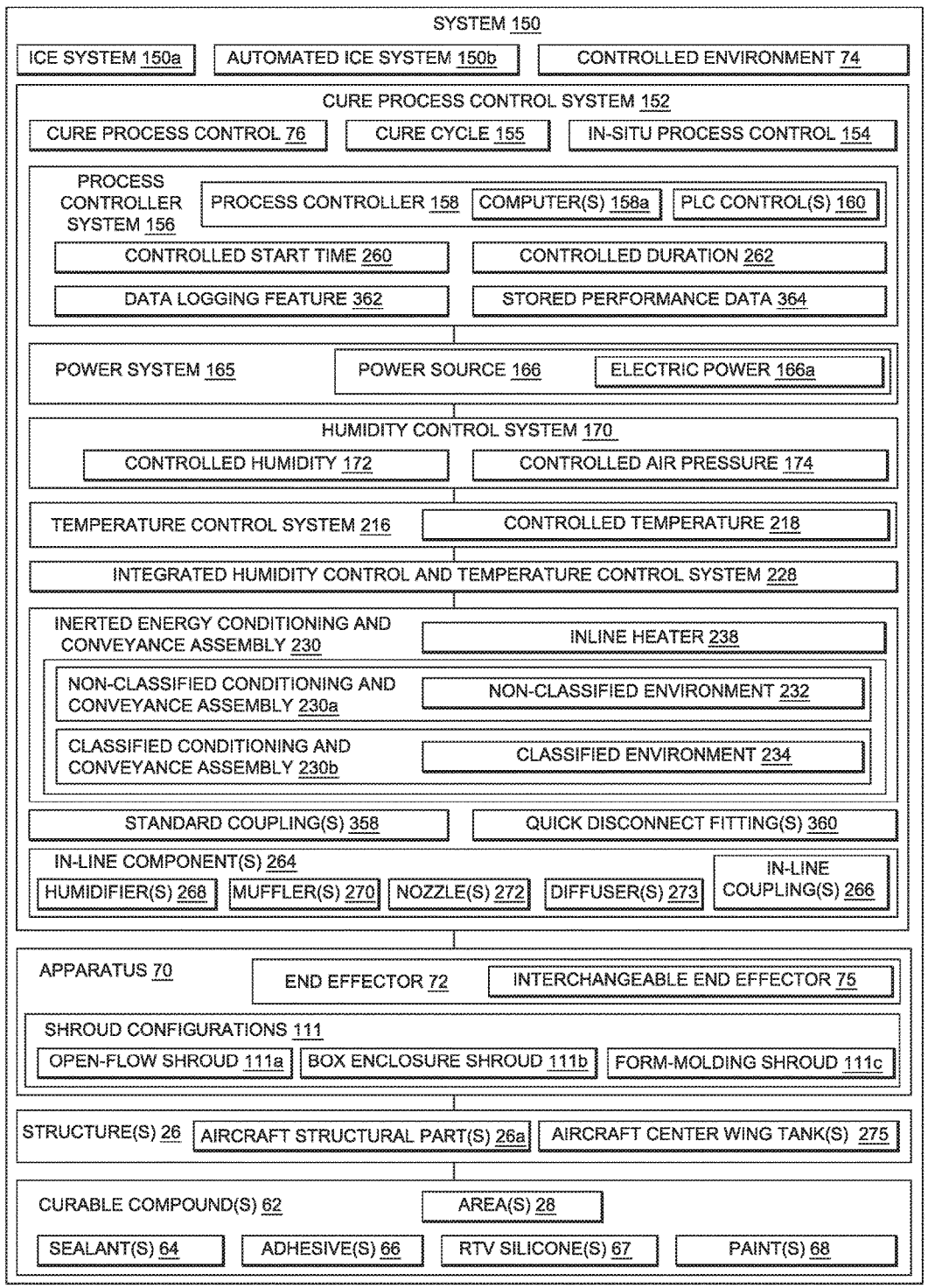
FIG. 6 is an illustration of a functional block diagram of exemplary embodiments of a system of the disclosure.

(see FIG. 4), or other fluids or gases, out of the end effector 72 (see FIGS. 5H-5I), as the air or fluid or gas is replaced with the curable compound 62 (see FIGS. 5I, 6). The vent port 88c (see FIGS. 5H-5I) may optionally serve as an indicator of when the hollow cavity 91 (see FIG. 5I) is completely filled or filled to a desired amount with the curable compound 62 (see FIGS. 5I, 6).

As shown in FIG. 5I, the mold body 80 has an interior surface 90b, the hollow cavity 91, and a cavity profile 92. The cavity profile 92 (see FIG. 5I) is preferably configured to correspond to or match a desired curable compound shape 94 (see FIG. 4), such as the outer profile of the desired curable compound shape 94 (see FIG. 4), so that the molding end effector 73a may be used as a forming mold.

The end effector 72b (see FIGS. 5H-5I) in the form of the molding end effector 73a (see FIGS. 5H-5I) having the dome shape 86a (see FIGS. 5H-5I) and having the one-piece mold configuration 81a (see FIGS. 5H-5I) is exemplary of a molding end effector 73a that has only one side or one piece. The curable compound(s) 62 (see FIG. 5I) would be applied to the area 28 (see FIG. 5I) of the hollow cavity 91 (see FIG. 5I) inside the hemisphere or dome of the molding end effector 73a (see FIG. 5I) that is formed between the interior surface 90b (see FIG. 5I) of the molding end effector 73a (see FIG. 5I) and the substrate 138 (see FIG. 5I).

FIG. 5J is an illustration of a enlarged sectional view of the one or more inner channels 130 and the one or more outer channels 114 of the circle 5J of FIG. 5I. As shown in FIG. 5J, the inner channel 130 preferably has the oblong cross section 140 with the optimized surface 142, such as an enlarged surface, that facilitates the convective heat transfer 136 (see FIG. 4), or provides an optimized surface for the convective heat transfer 136 (see FIG. 4) to take place. As further shown in FIG. 5J, the inner channel 130 preferably has the elongated outer surface 146 that provides the optimized radiative view factor 148, such as an enhanced view factor between the inner channel surface 132 that is heated and the interior surface 90b of the end effector 72 (see FIGS. 5H-5I). As shown in FIG. 5J, the one or more portions of the outer channel 114 are closer to the exterior surface 90a of the end effector 72 (see FIGS. 5H-5I) than the one or more portions of the inner channel 130, and the one or more portions of the inner channel 130 are closer to the interior surface 90b.

Figure 5K:
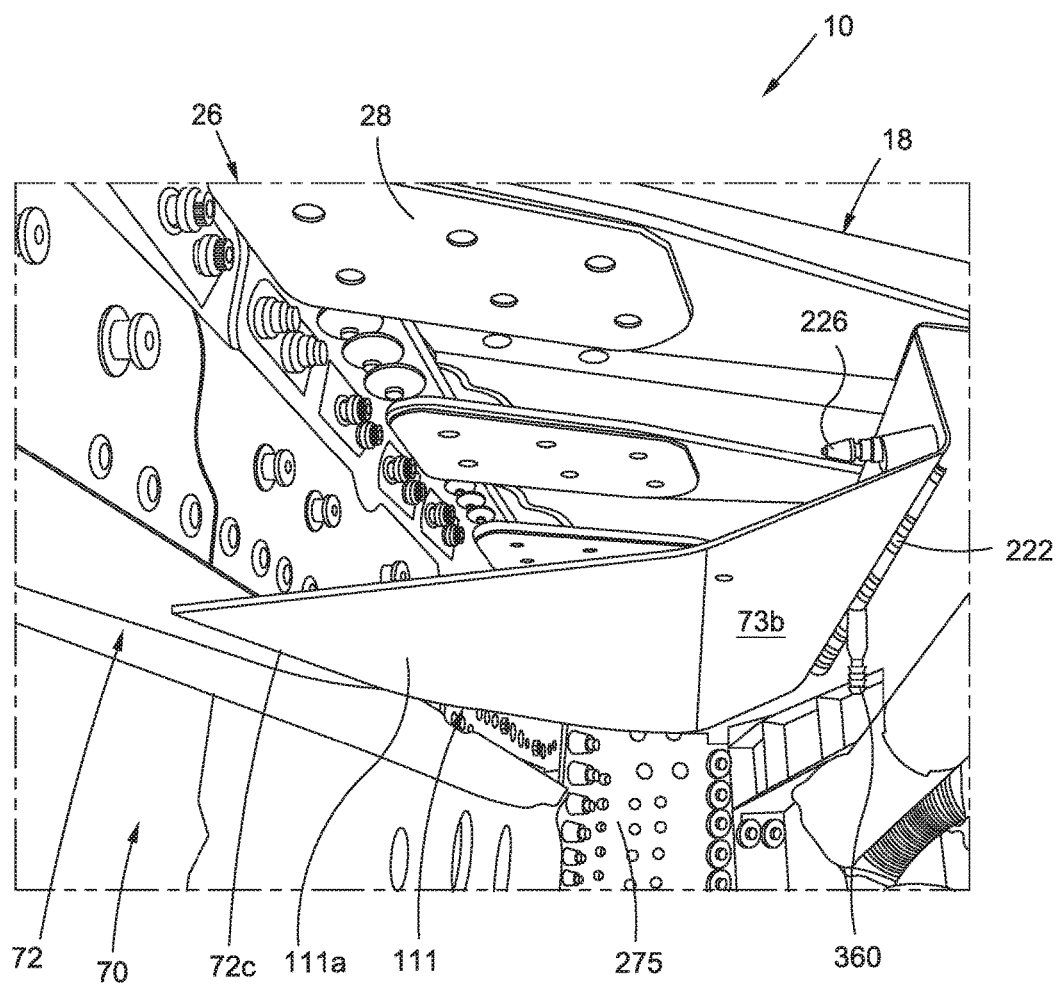
FIG. 5K is an illustration of a side perspective view of another embodiment of an apparatus of the disclosure in the form of a non-molding end effector comprising an open-flow shroud.

FIG. 5K is an illustration of a side perspective view of another embodiment of an apparatus 70, such as the end effector 72, of the disclosure in the form of end effector 72c, such as a non-molding end effector 73b, comprising a shroud configuration 111, such as an open-flow shroud 111a. As shown in FIG. 5K, the non-molding end effector 73b is open and positioned in an aircraft center wing tank 275 of a wing 18 of an air vehicle 10 for coating of a structure 26, such as an area 28 of the structure 26 with a curable compound 62 (see FIG. 6). FIG. 5K further shows an air manifold 222 and a quick disconnect fitting 360 connected to the open-flow shroud 111a.

Figure 5L:
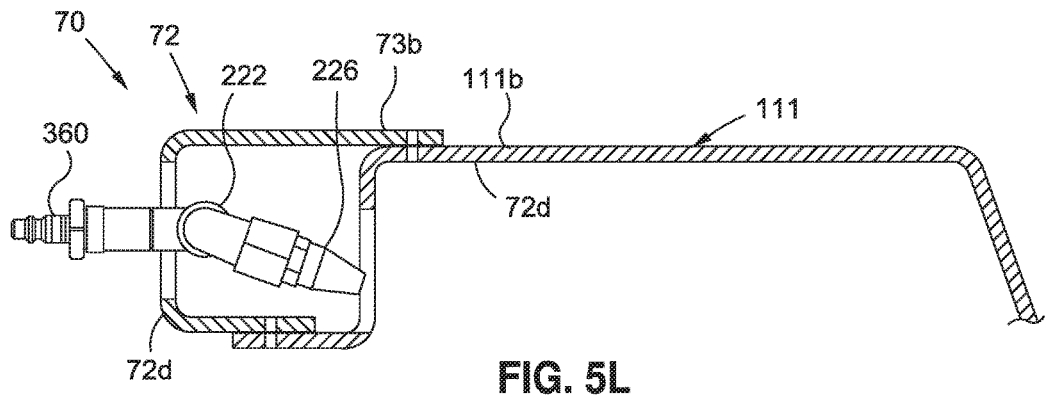
FIG. 5L is an illustration of a side view of another embodiment of an apparatus of the disclosure in the form of a non-molding end effector comprising a box enclosure shroud.

FIG. 5L is an illustration of a side view of another embodiment of an apparatus 70, such as the end effector 72, of the disclosure in the form of end effector 72d, such as a non-molding end effector 73b, comprising a shroud configuration 111, such as a box enclosure shroud 111. As shown in FIG. 5L, the non-molding end effector 73b is closed and is designed to be positioned around a structure 26 (see FIG. 1) with an area 28 (see FIG. 1) of the structure 26 (see FIG. 1) to be coated with a curable compound 62 (see FIG. 6). FIG. 5L further shows a quick disconnect fitting 360 connected to an air manifold 222, which is connected to an air manifold output 226.

Figure 5M:
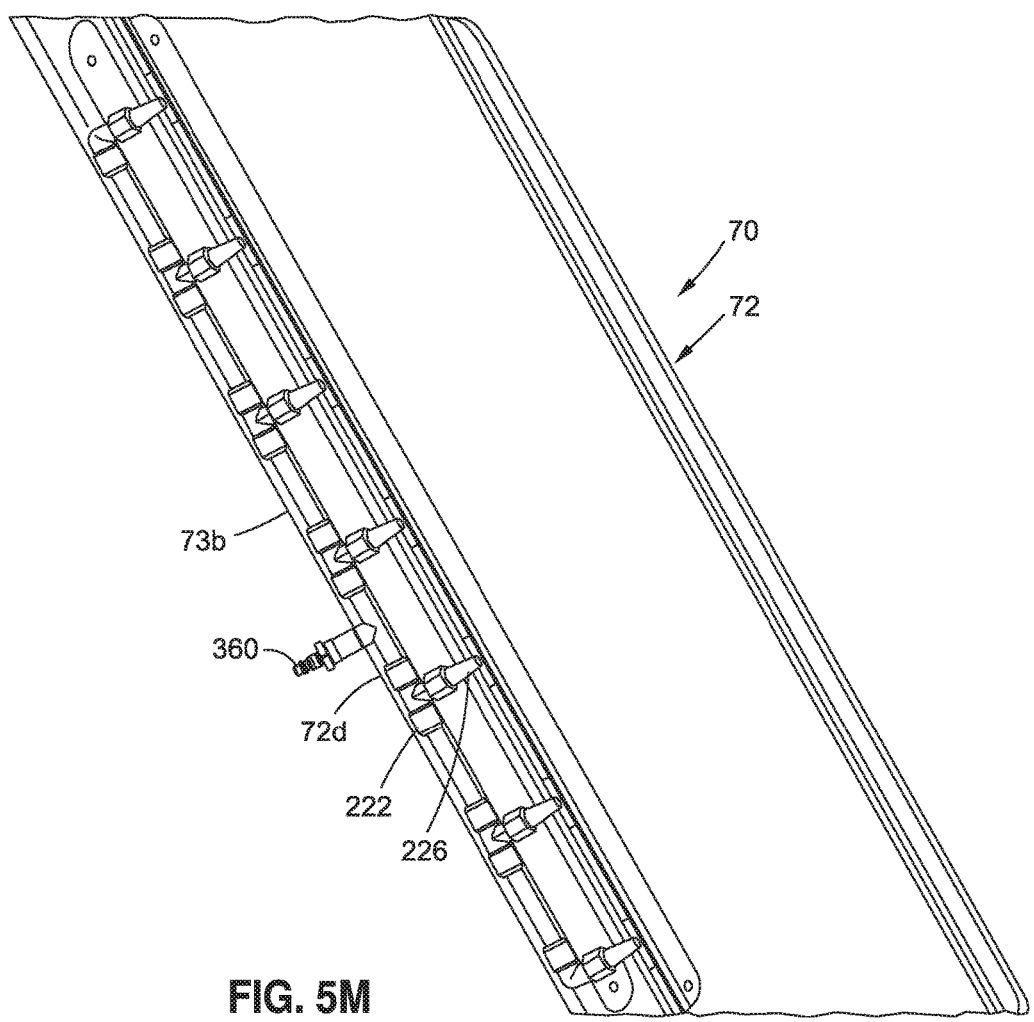
FIG. 5M is an illustration of a top view of the non-molding end effector box enclosure shroud of FIG. 5L.

FIG. 5M is an illustration of a top view of the non-molding end effector 73b box enclosure shroud 111b of FIG. 5L. FIG. 5M shows the quick disconnect fitting 360 connected to an air manifold 222, which is connected to an air manifold output 226.

Now referring to FIG. 6, FIG. 6 is an illustration of a functional block diagram of exemplary embodiments of the system 150 of the disclosure. For example, in an embodiment, there is provided a system 150 for isolating a controlled environment 74 for cure process control 76 of the application and cure of one or more curable compounds 62 to a structure 26.

As shown in FIG. 6, the system 150 comprises an isolated controlled environment (ICE) system 150a, and preferably, an automated ICE system 150b. As further shown in FIG. 6, the system 150 comprises a cure process control system 152 that controls the cure process control 76 of the cure cycle 155 of the curable compound(s) 62. Preferably, the cure process control system 152 (see FIG. 6) controls in-situ process control 154 (see FIG. 6).

As shown in FIG. 6, the cure process control system 152 comprises a process controller system 156 having a process controller 158, such as in the form of one or more computers 158a. The process controller system 156 (see FIG. 6) controls a controlled start time 260 (see FIG. 6) and a controlled duration 262 (see FIG. 6) of the cure cycle 155 (see FIG. 6).

The process controller system 156 (see FIG. 6) provides quality assurance and data logging by tracking and storing stored performance data 364 (see FIG. 6) through a data logging feature 362 (see FIG. 6), where the stored performance data 364 (see FIG. 6) may be used as part of a quality assurance plan for ensuring full conformity of the curable compound(s) 62 (see FIG. 6) to specifications prior to post-processing As shown in FIG. 6, the cure process control system 152 further comprises a power system 165 having a power source 166, such as in the form of electric power 166a. The process controller system 156 (see FIG. 6) is preferably coupled to the power system 165 (see FIG. 6).

As shown in FIG. 6, the cure process control system 152 further comprises one of a humidity control system 170, a temperature control system 216, or an integrated humidity control and temperature control system 228, each coupled to the process controller system 156 and the power system 165. Each of these components is discussed in more detail below with regard to FIGS. 7-9, respectively.

As shown in FIG. 6, the cure process control system 152 further comprises an inerted energy conditioning and conveyance assembly 230 having a first end 236a (see FIGS. 10A-10B) and a second end 236b (see FIGS. 10A-10B). The first end 236a (see FIGS. 10A-10B) is preferably coupled via a connector element 215 (see FIGS. 7-9) to one of the humidity control system 170 (see FIGS. 6, 7), the temperature control system 216 (see FIGS. 6, 8), or the integrated humidity control and temperature control system 228 (see FIGS. 6, 9).

In one embodiment, the inerted energy conditioning and conveyance assembly 230 (see FIG. 6) may comprise a non-classified conditioning and conveyance assembly 230a (see FIGS. 6, 10A) configured for use in a non-classified environment 232 (see FIG. 6). The non-classified conditioning and conveyance assembly 230a (see FIGS. 6, 10A) is a variation on known classified conveyance assemblies intended to offer additional options for the developed system. Without the limitation of requiring an insulated conveyance air flow line of a prescribed length, a simpler and more compact system may be deployed and higher temperatures can be applied to a given substrate, providing this substrate is not in a classified area. Higher temperatures may be achieved by connecting the heater assembly directly to the end effector 72 (see FIG. 4), thus avoiding the losses inherent in conveying the inerted energy. The non-classified conditioning and conveyance assembly 230*a* is limited in that it does not support controlled cure of curable compounds 62 when they are located inside of a classified environment 234 (see FIG. 6) (i.e., class one, division one ("C1D1") compliant area per NFPA (National Fire Protection Association) 70).

In another embodiment, the inerted energy conditioning and conveyance assembly 230 (see FIG. 6) comprises a classified conditioning and conveyance assembly 230*b* (see FIGS. 6, 10B) configured for use in a classified environment 234 (see FIG. 6). The classified conditioning and conveyance assembly 230*b* (see FIGS. 6, 10B) comprises an insulated air line 246 (see FIG. 10B) coupled to one of the one or more end effectors 72 (see FIG. 6). As shown in FIG. 10C, the insulated air line 246 has a central opening 248 and a plurality of concentric layers 250 around the central opening 248. The classified conditioning and conveyance assembly 230*b* (see FIG. 6) is a means for providing for use of the system 150 (see FIG. 7) in a classified environment 234 (see FIG. 6) (i.e., C1D1 compliant area per NFPA 70). This is a large part of the system 150 (see FIG. 6) uniqueness but imposes a limitation on the system 150 (see FIG. 6) capability due to the significant heat loss through the insulated c air line 246 (see FIG. 10B).

As shown in FIG. 6, the cure process control system 152 further comprises one or more standard coupling(s) 358, such as one or more quick disconnect fitting(s) 360. Each quick disconnect fitting 360 (see FIG. 6) provides for a fast and easy connection and disconnection of the insulated air line 246 (see FIG. 10B), as well as other fluid lines. The quick disconnect fitting 360 (see FIG. 6) may be manually operated and may be used to replace fitting connections which require tools to assemble and disassemble. A suitable known quick disconnect fitting 360 (see FIG. 6) may be used in the system 150 (see FIG. 6).

As shown in FIG. 6, the cure process control system 152 may further comprise one or more in-line components 264 comprising, for example, one or more humidifiers 268 for cure process control 76 refinement, one or more mufflers 270 for noise abatement during the one or more cure cycles 155, one or more nozzles 272 and one or more diffusers 273 for adiabatic boosting of heat application during the one or more cure cycles 155, or another suitable in-line component 264.

Adiabatic means occurring without gain or loss of heat, and when a gas is compressed under adiabatic conditions, its pressure increases and its temperature rises without the gain or loss of any heat, and when the gas expands under adiabatic conditions, its pressure and temperature both decrease without the gain or loss of heat. As used herein, "adiabatic boosting" of the heat application means the selective use of diffusers and nozzles inline to vary the diameter of the inerted energy conditioning and conveyance assembly 230 along the length of the path into the classified environment 234 (see FIG. 6). This variation is intended to favorably alter the temperature of the conditioned air 108 (see FIG. 4) by means of adiabatic expansion and adiabatic compression, i.e., without additional power to the process.

The in-line components 264 (see FIG. 6) may be added to the system 150 (see FIG. 6) via the standard couplings 358 (see FIG. 6) to further condition the cure cycle 155 (see FIG. 6). Preferably, the one or more in-line components 264 (see FIG. 6) may be positioned upstream of the end effector 72 (see FIG. 4).

As shown in FIG. 6, the system 150 further comprises the apparatus 70, such as one or more end effectors 72. Each end effector 72 (see FIG. 6 is preferably configured for independent coupling to the second end 236*b* (see FIGS. 10A-10B) of the inerted energy conditioning and conveyance assembly 230 (see FIG. 6), and each end effector 72 (see FIG. 6) is preferably shaped to provide a shroud 110 (see FIG. 4) over an area 28 (see FIG. 6) covered with the one or more curable compounds 62 (see FIG. 6) on a structure 26 (see FIG. 6), to isolate the area 28 (see FIG. 6) and to isolate the controlled environment 74 (see FIG. 6) for cure process control 76 (see FIG. 6) of the application and cure of the one or more curable compounds 62. (see FIG. 6).

The cure process control system 152 (see FIG. 6) independently controls one or more of a controlled humidity 172 (see FIG. 6), a controlled air pressure 174 (see FIG. 6), a controlled temperature 218 (see FIG. 6), a controlled start time 260 (see FIG. 6), and a controlled duration 262 (see FIG. 6), for each of the one or more end effectors 72 (see FIG. 6). Further, the cure process control system 152 (see FIG. 6) independently controls one or more cure cycles 155 (see FIG. 6) of one or more curable compounds 62 (see FIG. 6) simultaneously. Preferably, the system 150 (see FIG. 6) utilizes four (4) independently actuated end effectors 72 (see FIG. 6). However, additional independently actuated end effectors 72 (see FIG. 6) or less independently actuated end effectors 72 (see FIG. 6) may be used as needed.

As discussed in detail above, the one or more end effectors 72 may comprise one or more involute conformal molds 78 (see FIGS. 4, 5A). Each involute conformal mold 78 (see FIGS. 4, 5A) has a mold body 80 (see FIGS. 4, 5A). In the embodiment shown in FIGS. 5A-5F, the mold body 80 may comprise a first portion 80*a* (see FIGS. 5A, 5E, 5F) and a second portion 80*b* (see FIGS. 5E, 5F). The involute conformal mold 78 (see FIGS. 4, 5A) further comprises an interior surface 90*b* (see FIGS. 4, 5B) with a cavity profile 92 (see FIGS. 4, 5B) corresponding to a desired curable compound shape 94 (see FIG. 4). The mold body 80 (see FIGS. 4, 5A-5C) comprises a plurality of involute channels 100 (see FIGS. 4, 5A-5C) with spiral flow paths 102 (see FIGS. 4, 5A). As further discussed in detail above, the plurality of involute channels 100 (see FIGS. 4, 5A-5C) comprises one or more outer channels 114 (see FIGS. 4, 5B-5D) and one or more inner channels 130 (see FIGS. 4, 5B-5D). Each outer channel 114 (see FIGS. 4, 5B-5D) has an outer path profile 118 (see FIGS. 4, 5C) configured for regenerative heat transfer 124 (see FIG. 4) to the one or more curable compounds 62 (see FIG. 6). Each inner channel 130 (see FIGS. 4, 5B-5D) has an inner path profile 134 (see FIGS. 4, 5C) configured for convective heat transfer 136 (see FIG. 4) and radiative heat transfer 144 (see FIG. 4) to the one or more curable compounds (see FIG. 6).

As shown in FIG. 6, the end effector 72 may comprise a shroud configuration 111. Various shroud configurations 111 (see FIG. 6) and devices have been developed to properly apply and isolate the controlled environment 74 (see FIG. 6) for a variety of requirements and areas of use. Examples of shroud configurations 111 (see FIG. 6) that may be used in the system 150 may include an open-flow shroud 111*a*, a box enclosure shroud 111*b*, a form-molding shroud 111*c*, or another suitable shroud configuration 111.

As further shown in FIG. 6, the structure 26 preferably comprises an aircraft structural part 26a, such as an aircraft center wing tank 275 (see FIG. 6). Preferably, the system 150 (see FIG. 6) is portable and comprises a portable apparatus 169 (see FIG. 11), such as a portable cart 169a (see FIG. 11) configured to transport the system 150 (see FIG. 6) to an air vehicle 10 (see FIG. 1), such as an aircraft 10a (see FIG. 1), for in-situ process control 154 (see FIG. 6) of application of the one or more curable compounds 62 (see FIG. 6) to the area 28 (see FIGS. 1, 6).

As shown in FIG. 6, one or more curable compound(s) 62 may be applied to one or more area(s) 28 of the structure 26 (see FIG. 1), and the one or more curable compound(s) 62 may comprise one or more sealant(s) 64, one or more adhesive(s) 66, one or more RTV (room temperature vulcanization) silicones 67, one or more paint(s) 68, or another suitable curable compound 62.

Figure 7:
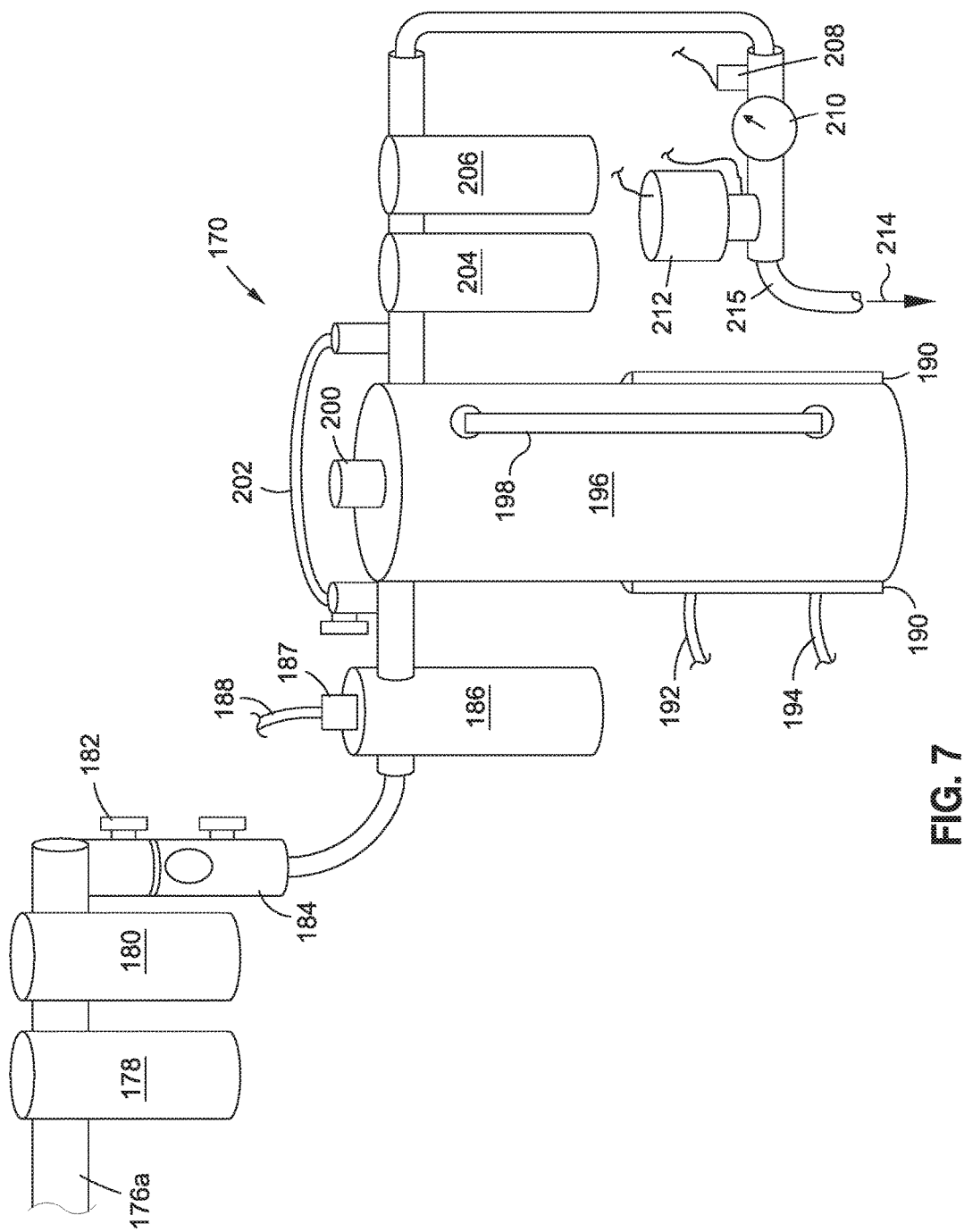
FIG. 7 is an illustration of a schematic diagram of an embodiment of a humidity control system that may be used in embodiments of the system of the disclosure.

Now referring to FIG. 7, FIG. 7 is an illustration of a schematic diagram of an embodiment of a humidity control system 170 that may be used in embodiments of the system 150 of the disclosure. As shown in FIG. 7, the humidity control system 170 comprises an air supply 176a of air coupled to an air dryer 178, an air filter 180, and an air shut off valve 182. As further shown in FIG. 7, the air shut off valve 182 is coupled to an air pressure regulator 184, which is coupled to an air heater 186. The air heater 186 (see FIG. 7) has an air heater thermocouple 187 (see FIG. 7) connected to an air heater power supply 188 (see FIG. 7).

As further shown in FIG. 7, the humidity control system 170 comprises a heater blanket 190 coupled to a pressure vessel 196. The heater blanket 190 (see FIG. 7) is further coupled to a heater blanket power supply 192 (see FIG. 7) and a heater blanket thermocouple 194 (see FIG. 7). The pressure vessel 196 (see FIG. 7) comprises a water level sight 198 (see FIG. 7) and a drain/water fill 200 (see FIG. 7). A pressure vessel by-pass 202 (see FIG. 7) connects the air heater 186 (see FIG. 7) to an air dryer 204 (see FIG. 7) and an air filter 206 (see FIG. 7) and bypasses the pressure vessel 196 (see FIG. 7).

As further shown in FIG. 7, the humidity control system 170 comprises a pressure sensor 208, a pressure gauge 210, and a flow control valve 212. An air exit 214 (see FIG. 7) allows air to flow out of the humidity control system 170 (see FIG. 7), and a connector element 215 (see FIG. 7) connects the humidity control system 170 (see FIG. 7) to either a non-classified conditioning and conveyance assembly 230a (see FIG. 10A) if in a non-classified environment 232 (see FIG. 6), or to a classified conditioning and conveyance assembly 230b (see FIG. 10B) if in a classified environment 234 (see FIG. 6).

As shown by the humidity control system 170 in FIG. 7, incoming air is dried, filtered, and pressure regulated, prior to being pre-heated and exposed to humidity. The air is then re-dried and filtered, prior to being transported to the controlled environment 74 (see FIG. 6) for cure process control 76 (see FIG. 6).

Figure 8:
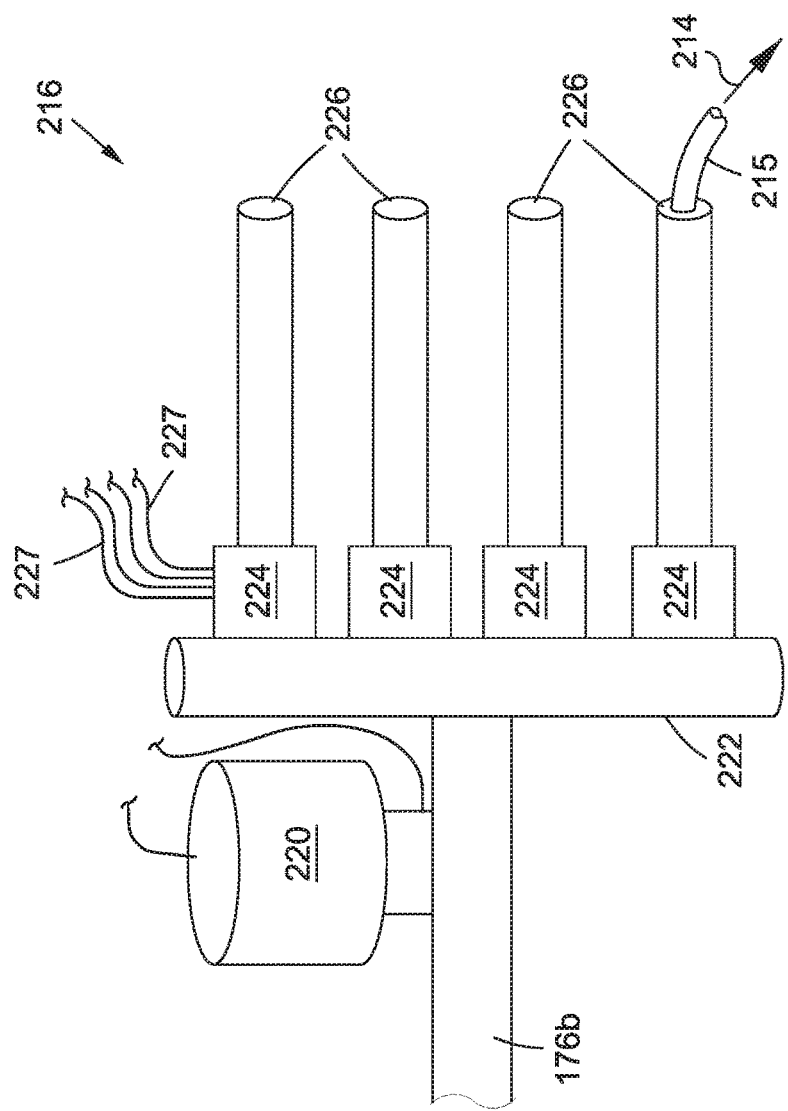
FIG. 8 is an illustration of a schematic diagram of an embodiment of a temperature control system that may be used in embodiments of the system of the disclosure.

Now referring to FIG. 8, FIG. 8 is an illustration of a schematic diagram of an embodiment of a temperature control system 216 that may be used in embodiments of the system 150 of the disclosure. As shown in FIG. 8, the temperature control system 216 comprises an air supply 176b coupled to a pressure switch 220 and an air manifold 222. The air manifold 222 (see FIG. 8) is coupled to flow control valves 224 (see FIG. 8) and air manifold outputs 226 (see FIG. 8). Wires 227 (see FIG. 8) preferably connect the temperature control system 216 (see FIG. 8) to the process controller 158 (see FIG. 6).

As further shown in FIG. 8, an air exit 214 allows air to flow out of the temperature control system 216, and the connector element 215 connects the temperature control system 216 to either the non-classified conditioning and conveyance assembly 230a (see FIG. 10A) if in a non-classified environment 232 (see FIG. 6), or to the classified conditioning and conveyance assembly 230b (see FIG. 10B) if in a classified environment 234 (see FIG. 6).

As shown by the temperature control system 216 in FIG. 8, incoming air is pressure regulated and distributed through the air manifold 222 for multiple air manifold outputs 226 or control lines, after which the air flow is flow regulated and heated inline prior to being transported to the controlled environment 74 (see FIG. 6) for cure process control 76 (see FIG. 6).

Figure 9:
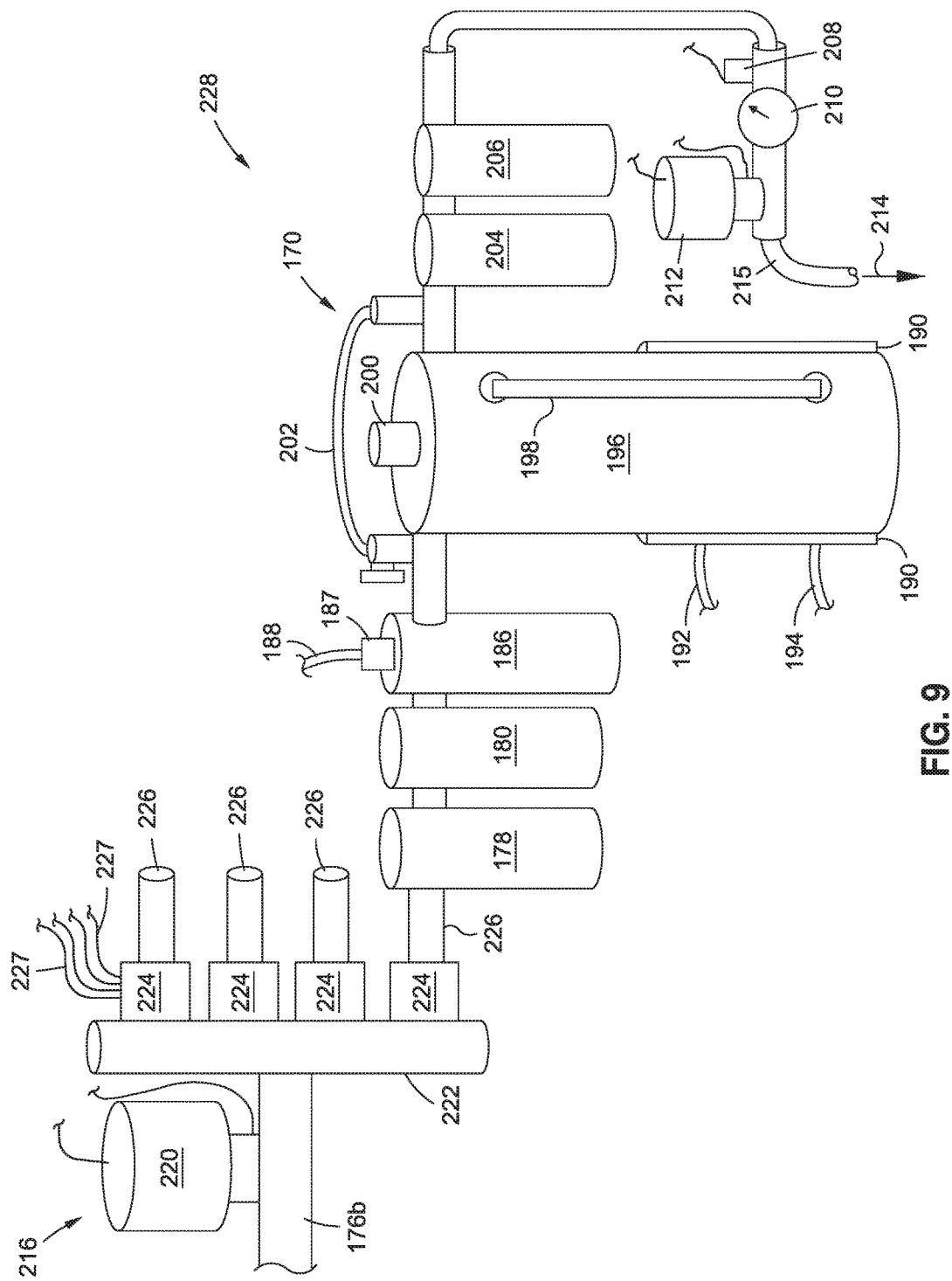
FIG. 9 is an illustration of a schematic diagram of an embodiment of an integrated humidity control and temperature control system that may be used in embodiments of the system of the disclosure.

Now referring to FIG. 9, FIG. 9 is an illustration of a schematic diagram of an embodiment of an integrated humidity control and temperature control system 228 that may be used in embodiments of the system 150 of the disclosure. The integrated humidity control and temperature control system 228 (see FIG. 9) integrates the humidity control system 170 (see FIG. 9) and the temperature control system 216 (see FIG. 9) together in one unit for simultaneous temperature and humidity controls, each of the processes occurring in series.

As shown in FIG. 9, the temperature control system 216 of the integrated humidity control and temperature control system 228 comprises the air supply 176b coupled to the pressure switch 220 and the air manifold 222. The air manifold 222 (see FIG. 9) is coupled to flow control valves 224 (see FIG. 9) and air manifold outputs 226 (see FIG. 9). Wires 227 (see FIG. 8) preferably connect the temperature control system 216 to the process controller 158 (see FIG. 6).

As further shown in FIG. 9, an air manifold output 226 of the temperature control system 216 is coupled or connected to the air dryer 178 of the humidity control system 170. As further shown in FIG. 9, the humidity control system 170 of the integrated humidity control and temperature control system 228 comprises the air filter 180 and the air heater 186 with the air heater thermocouple 187 connected to the air heater power supply 188.

As further shown in FIG. 9, the humidity control system 170 of the integrated humidity control and temperature control system 228 comprises the heater blanket 190 coupled to the pressure vessel 196. The heater blanket 190 (see FIG. 9) is further coupled to the heater blanket power supply 192 (see FIG. 9) and the heater blanket thermocouple 194 (see FIG. 9). The pressure vessel 196 (see FIG. 9) comprises the water level sight 198 (see FIG. 9) and the drain/water fill 200 (see FIG. 9). The pressure vessel by-pass 202 (see FIG. 9) connects the air heater 186 (see FIG. 9) to the air dryer 204 (see FIG. 9) and the air filter 206 (see FIG. 9) and bypasses the pressure vessel 196 (see FIG. 9).

As further shown in FIG. 9, the humidity control system 170 of the integrated humidity control and temperature control system 228 comprises the pressure sensor 208, the pressure gauge 210, and the flow control valve 212. The air exit 214 (see FIG. 9) allows air to flow out of the humidity control system 170 (see FIG. 9) of the integrated humidity control and temperature control system 228 (see FIG. 9), and the connector element 215 (see FIG. 9) connects the humidity control system 170 of the integrated humidity control and temperature control system 228 (see FIG. 9) to either the non-classified conditioning and conveyance assembly 230a (see FIG. 10A) if in a non-classified environment 232 (see FIG. 6), or to the classified conditioning and conveyance assembly 230b (see FIG. 10B) if in a classified environment 234 (see FIG. 6).

Now referring to FIG. 10A, FIG. 10A is an illustration of a schematic diagram of an embodiment of an inerted energy conditioning and conveyance assembly 230 in the form of a non-classified conditioning and conveyance assembly 230a that may be used in embodiments of the system 150 of the disclosure and that may be used in a non-classified environment 232 (see FIG. 6). As shown in FIG. 10A, the inerted energy conditioning and conveyance assembly 230, such as in the form of the non-classified conditioning and conveyance assembly 230a, comprises a first end 236a and a second end 236b. The first end 236a (see FIG. 10A) is connected to the connector element 215 (see FIG. 10A). The second end 236b (see FIG. 10A) is configured for coupling or attachment to the end effector 72 (see 5A) via a port 88 (see FIG. 5A).

As further shown in FIG. 10A, the inerted energy conditioning and conveyance assembly 230, such as in the form of the non-classified conditioning and conveyance assembly 230a, comprises an inline heater 238 coupled to a heater power line 240 and coupled to a heater thermocouple 242. The inerted energy conditioning and conveyance assembly 230 (see FIG. 10A), such as in the form of the non-classified conditioning and conveyance assembly 230a (see FIG. 10A), may be used outside of classified environments 234 (see FIG. 6) and positioned local to the one or more curable compounds 62 (see FIG. 6). Thus, a compact system may be deployed Now referring to FIG. 10B, FIG. 10B is an illustration of a schematic diagram of another embodiment of an inerted energy conditioning and conveyance assembly 230 in the form of a classified conditioning and conveyance assembly 230b that may be used in embodiments of the system 150 of the disclosure and that is used in a classified environment 234 (see FIG. 6). As shown in FIG. 10B, the inerted energy conditioning and conveyance assembly 230, such as in the form of the classified conditioning and conveyance assembly 230b, comprises a first end 236a and a second end 236b. The first end 236a (see FIG. 10B) is connected to the connector element 215 (see FIG. 10B). The second end 236b (see FIG. 10B) is configured for coupling or attachment to the end effector 72 (see 5A) via a port 88 (see FIG. 5A).

As further shown in FIG. 10B, the inerted energy conditioning and conveyance assembly 230, such as in the form of the classified conditioning and conveyance assembly 230b, comprises an inline heater 238 coupled to a connector element 215, coupled to a heater power line 240, and coupled to a heater thermocouple 242. In this embodiment, the inerted energy conditioning and conveyance assembly 230 (see FIG. 10B), such as in the form of the classified conditioning and conveyance assembly 230b (see FIG. 10B), further comprises an insulated air line 246 (see FIG. 10B) coupled or connected at connection point 244 (see FIG. 10B) to the heater thermocouple 242 (see FIG. 10B). Preferably, the insulated air line 246 (see FIG. 10B) is compressed.

Now referring to FIG. 10C, FIG. 10C is an illustration of a cross-sectional view of the insulated air line 246 of the classified conditioning and conveyance assembly 230b of FIG. 10B taken along cross-section lines 10C-10C of FIG. 10B. As shown in FIG. 10C, the insulated air line 246 comprises a central opening 248 for air to flow from the classified conditioning and conveyance assembly 230b to the end effector 72 (see FIG. 5A). As further shown in FIG. 10C, the insulated air line 246 comprises a plurality of concentric layers 250. The plurality of concentric layers 250 (see FIG. 10C) may comprise, for example, a smooth bore hose base layer 252 (see FIG. 10C), a stainless steel over-braid layer 254 (see FIG. 10C), an insulating wrap over-braid layer 256 (see FIG. 10C), and an abrasion resistant and high heat resistant material over-braid layer 258 (see FIG. 10C), for an optimal amount of insulation, flexibility, and robustness. Preferably, the abrasion resistant and high heat resistant material over-braid layer 258 (see FIG. 10C) provides abrasion protection and resistance and provides high heat protection and high heat resistance.

Inerted energy 106 (see FIG. 6) is preferably transported through the insulated air line 246 (see FIG. 10B), terminating at a quick disconnect fitting 360 (see FIGS. 5F, 6). The quick disconnect fitting 360 (see FIGS. 5F, 6) provides for a fast and easy connection and disconnection of the insulated air line 246 (see FIG. 10B), as well as other fluid lines. The quick disconnect fitting 360 (see FIG. 6) may be manually operated and may be used to replace fitting connections which require tools to assemble and disassemble. A suitable known quick disconnect fitting 360 (see FIG. 6 may be used.

The insulated air line 246 (see FIGS. 10B-10C) transports or conveys the inerted energy 106 (see FIG. 6) across the threshold of the classified environment 234 (see FIG. 6) and to the area 28 (see FIG. 6) covered or shrouded by the end effector 72 (see FIGS. 5A, 6).

Figure 11:
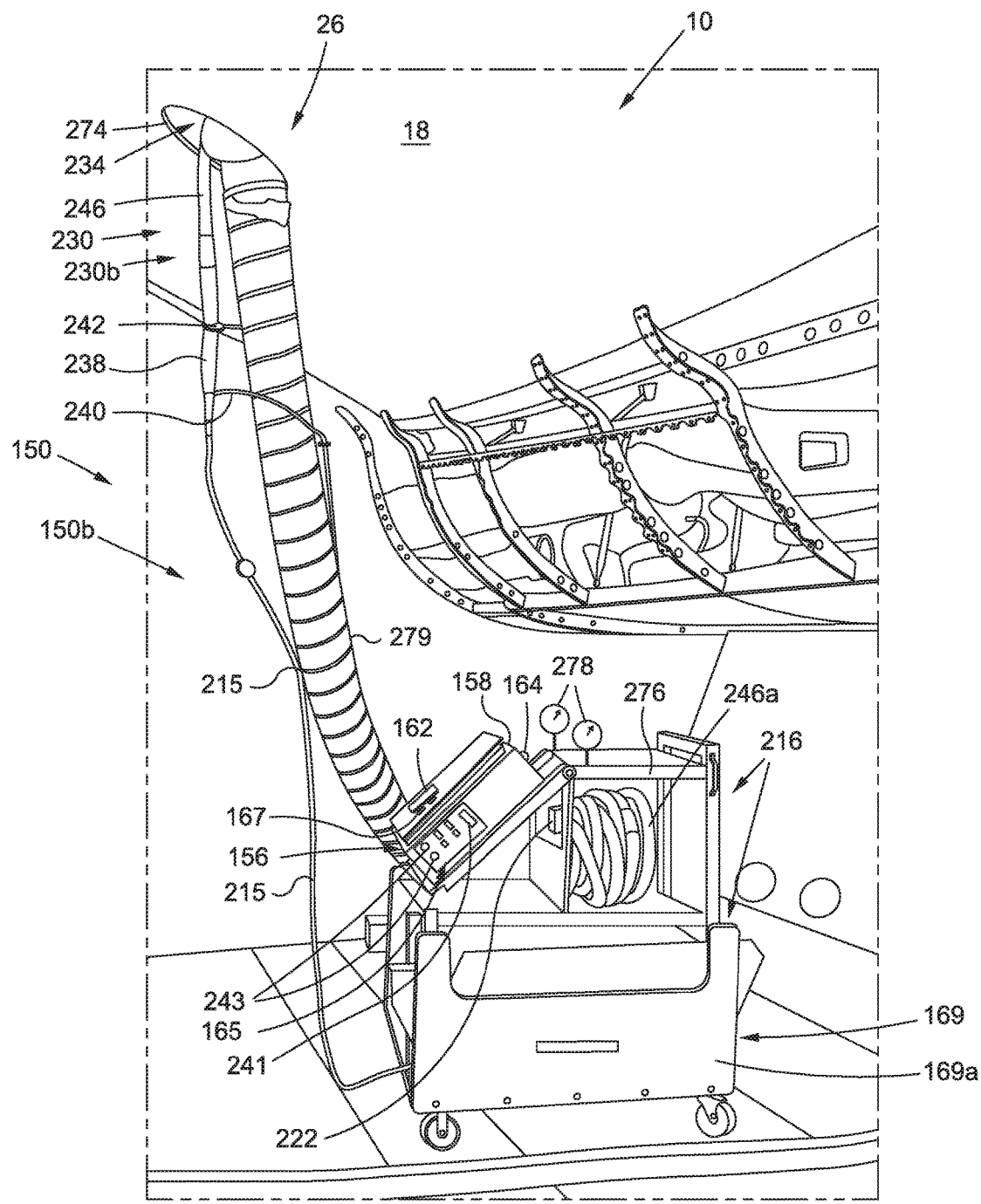
FIG. 11 is an illustration of a perspective view of an embodiment of the system of the disclosure in the form of an automated isolated controlled environment (ICE) system.

Now referring to FIG. 11, FIG. 11 is an illustration of a perspective view of an embodiment of the system 150 of the disclosure in the form of an automated isolated controlled environment (ICE) system 150b. As shown in FIG. 11, the automated isolated controlled environment (ICE) system 150b comprises a process controller system 156 with a process controller 158. As further shown in FIG. 11, the process controller 158 comprises an automated process control interface 162, power switches 167 for turning the automated isolated controlled environment (ICE) system 150b on and off, and an alarm 164. The alarm 164 (see FIG. 11) may be activated or sound during the cure cycle 155 (see FIG. 6), for example, when there is a fault that displays on the automated process control interface 162 (see FIG. 11). The fault may include, for example, no air at the beginning of the heating process, the heater is not able to hold its temperature because of a high setpoint or the process thermocouples are not plugged in, there is no air or a decrease in air supply as the heater is trying to reach its temperature, or another type of fault. If the fault is fixed (i.e., the air supply is turned on, or the correct pressure is verified), the appropriate heater may be restarted to resume the curing cycle 155 (see FIG. 6). The process controller 158 (see FIG. 11) further comprises internal programmable logic controller (PLC) controls 160 (not shown) (see FIG. 6).

As further shown in FIG. 11, the automated isolated controlled environment (ICE) system 150b comprises a power system 165 on the side of the process controller 158, where the power system 165 includes a heater power line outlet 241, one or more thermocouple receptacles 243, and any other suitable power source or power supply devices. As further shown in FIG. 11, the automated isolated controlled environment (ICE) system 150b is preferably portable and may be installed and transported on a portable apparatus 169, such as a portable cart 169a.

As further shown in FIG. 11, the automated isolated controlled environment (ICE) system 150b comprises a temperature control system 216 connected to a classified conditioning and conveyance assembly 230b via the connector element 215. In other embodiments, the automated isolated controlled environment (ICE) system 150b may comprise an integrated humidity control and temperature control system 228 (see FIG. 9). FIG. 11 shows the classified conditioning and conveyance assembly 230b having an inline heater 238 connected to a heater power line 240 and connected to the connector element 215, and having a heater thermocouple 242 coupled to the inline heater 238 and coupled to an insulated air line 246. Additional insulated air line 246a (see FIG. 11) may be stored in housing portion 276 (see FIG. 11) of the portable apparatus 169 (see FIG. 11), such as the portable cart 169a (see FIG. 11). As further shown in FIG. 11, the classified conditioning and conveyance assembly 230b is inserted through the structure 26 comprising an access panel 274 in the wing 18 of the air vehicle 10. The classified conditioning and conveyance assembly 230b is connected or coupled to an end effector 72 (not shown) (see FIG. 5A) within the classified environment 234 (see FIG. 11). An optional environmental duct 279 (see FIG. 11) may be used in the classified environment 234 (see FIG. 11) but is not a part of the automated isolated controlled environment (ICE) system 150b (see FIG. 11).

The temperature control system 216 (see FIG. 11) of the automated isolated controlled environment (ICE) system 150b (see FIG. 11) may further comprise one or more pressure reading devices 278 (see FIG. 11) positioned near the process controller 158 (see FIG. 11) on the portable apparatus 169 (see FIG. 11), such as the portable cart 169a (see FIG. 11), and may further comprise an air manifold 222 (see FIG. 11). Once the inline heater 238 (see FIG. 11) is connected via the connector element 215 (see FIG. 11) to the temperature control system 216 (see FIG. 11) of the automated isolated controlled environment (ICE) system 150b (see FIG. 11), and once the air supply 176b (see FIG. 9) is turned on, the pressure for the inline heater 238 (see FIG. 11) may be read and verified with the one or more pressure reading devices 278 (see FIG. 11). Preferably, the pressure is between 25 psi (pounds per square inch) and 27 psi. However, another suitable pressure may be used, depending on the curable compounds 62 (see FIG. 6) used and the embodiments of the system 150 (see FIG. 6) used.

Figure 12:
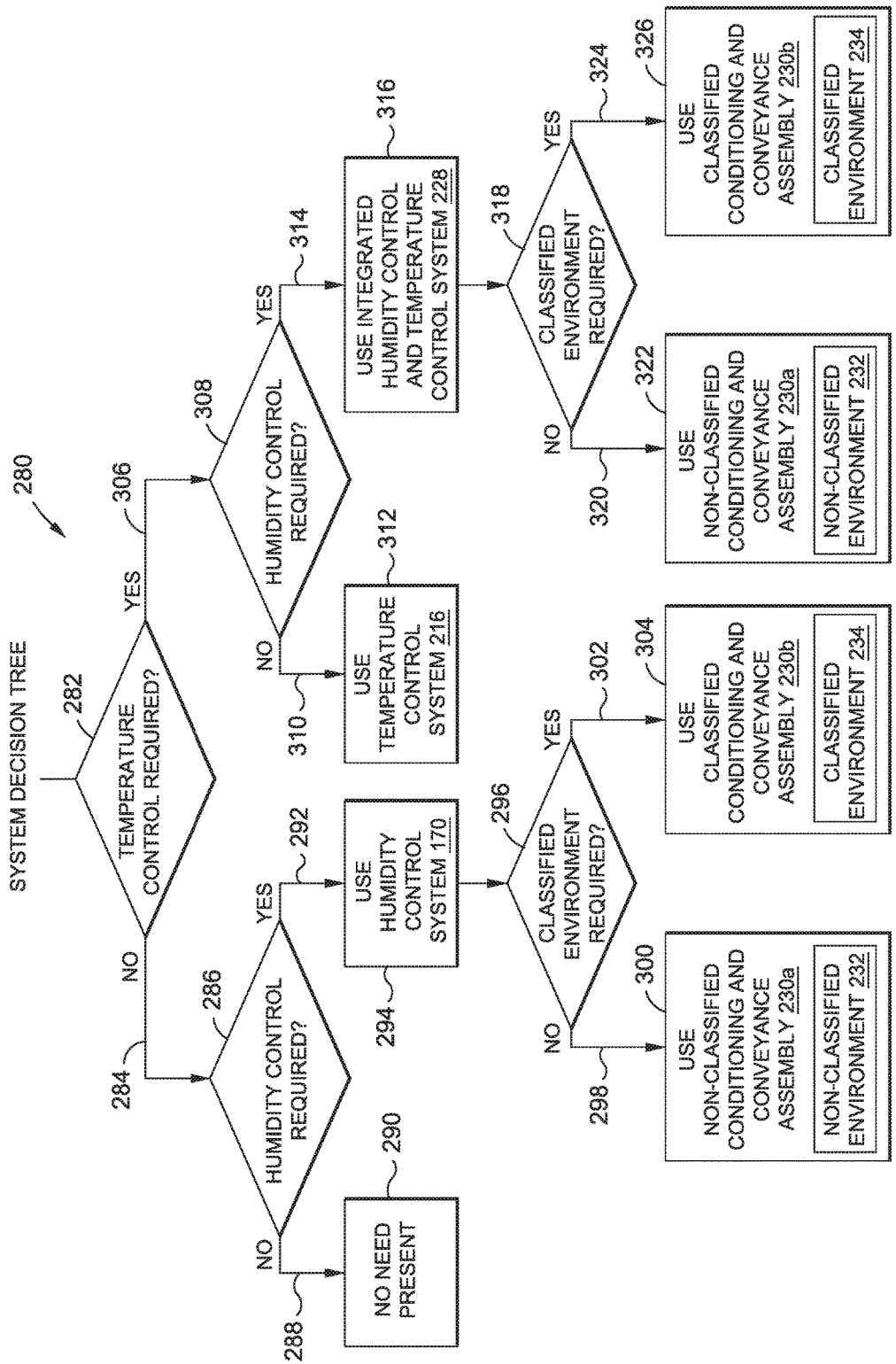
FIG. 12 is an illustration of a system decision tree for decisions regarding the use of a humidity control system, a temperature control system, and a classified or non-classified conditioning and conveyance system for embodiments of the system of the disclosure.

Now referring to FIG. 12, FIG. 12 is an illustration of a system decision tree 280 for decisions regarding the use of a humidity control system 170, the use of a temperature control system 216, and/or the use of a non-classified conditioning and conveyance assembly 230a or a classified conditioning and conveyance assembly 230b for embodiments of the system 150 (see FIG. 6) of the disclosure.

As shown in FIG. 12, the system decision tree 280 includes an inquiry 282 of whether temperature control is required for the system 150, such as in the form of the isolated controlled environment (ICE) system 150a. If a "NO" answer 284 (see FIG. 12), then proceed to an inquiry 286 (see FIG. 12) of whether humidity control is required for the system 150. If a "NO" answer 288 (see FIG. 12), then a decision 290 (see FIG. 12) of no need present for both temperature control and humidity control is made.

As further shown in FIG. 12, if a "YES" answer 292 to the inquiry 286 of whether humidity control is required for the system 150 is made, then a decision 294 to use a humidity control system 170 is made, and then proceed to an inquiry 296 of whether a classified environment is required. If a "NO" answer 298 (see FIG. 12), then a decision 300 (see FIG. 12) to use a non-classified conditioning and conveyance assembly 230a (see FIG. 12) in a non-classified environment 232 (see FIG. 12) is made. If a "YES" answer 302 (see FIG. 12), then a decision 304 (see FIG. 12) to use a classified conditioning and conveyance assembly 230b (see FIG. 12) in a classified environment 234 (see FIG. 12) is made.

As further shown in FIG. 12, if a "YES" answer 306 to the inquiry 282 of whether temperature control is required for the system 150 is made, then proceed to an inquiry 308 of whether humidity control is required for the system 150. If a "NO" answer 310 (see FIG. 12), then a decision 312 (see FIG. 12) to use the temperature control system 216 (see FIG. 12) is made. If a "YES" answer 314, then a decision 316 to use an integrated humidity control and temperature control system 228 is made, and then proceed to an inquiry 318 of whether a classified environment is required. If a "NO" answer 320 (see FIG. 12), then a decision 322 (see FIG. 12) to use the non-classified conditioning and conveyance assembly 230a (see FIG. 12) in the non-classified environment 232 (see FIG. 12) is made. If a "YES" answer 324 (see FIG. 12), then a decision 326 (see FIG. 12) to use the classified conditioning and conveyance assembly 230b (see FIG. 12) in the classified environment 234 (see FIG. 12) is made.

Figure 13:
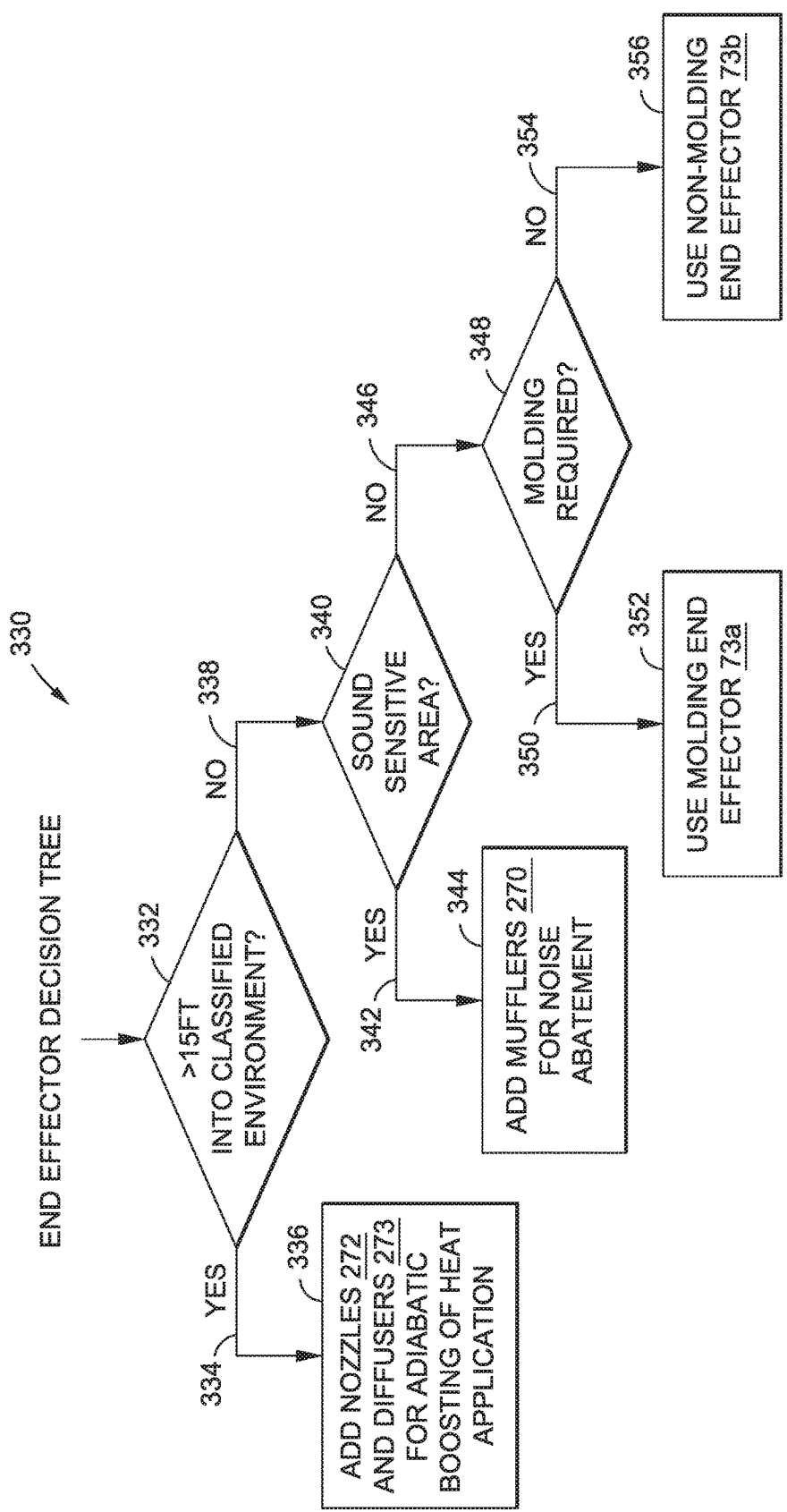
FIG. 13 is an illustration of an end effector decision tree for decisions regarding the use of additional in-line components and the use of molding or non-molding end effectors for embodiments of the system of the disclosure.

Now referring to FIG. 13, FIG. 13 is an illustration of an end effector decision tree 330 for decisions regarding the use of additional in-line components 264 (see FIG. 6), such as nozzles 272 (see FIG. 6), diffusers 273 (see FIG. 6), and mufflers 270 (see FIG. 6), and the use of a molding end effector 73a (see FIG. 6), or the use of a non-molding end effector 73b (see FIG. 6), for embodiments of the system 150 (see FIG. 6) of the disclosure.

As shown in FIG. 13, the end effector decision tree 330 includes an inquiry 332 of whether the system 150 (see FIG. 6) is positioned less than 15 (fifteen) feet into a classified environment 234 (see FIG. 6). If a "YES" answer 334 (see FIG. 13), then a decision 336 (see FIG. 13) to add nozzles 272 (see FIG. 13) and diffusers 273 (see FIG. 13) for adiabatic boosting of heat application is made. If a "NO" answer 338 (see FIG. 13), then proceed to an inquiry 340 (see FIG. 13) of whether the system 150 (see FIG. 6) is in a sound sensitive area. If a "YES" answer 342 (see FIG. 13), then a decision 344 (see FIG. 13) to add mufflers 270 (see FIG. 13) for noise abatement is made. If a "NO" answer 346 (see FIG. 13), then proceed to an inquiry 348 (see FIG. 13) of whether molding is required. As shown in FIG. 13, if a "YES" answer 350, then a decision 352 to use a molding end effector 73a (see FIG. 4) is made. If a "NO" answer 354, then a decision 356 to use a non-molding end effector 73b (see FIG. 4) is made.

Figure 14:
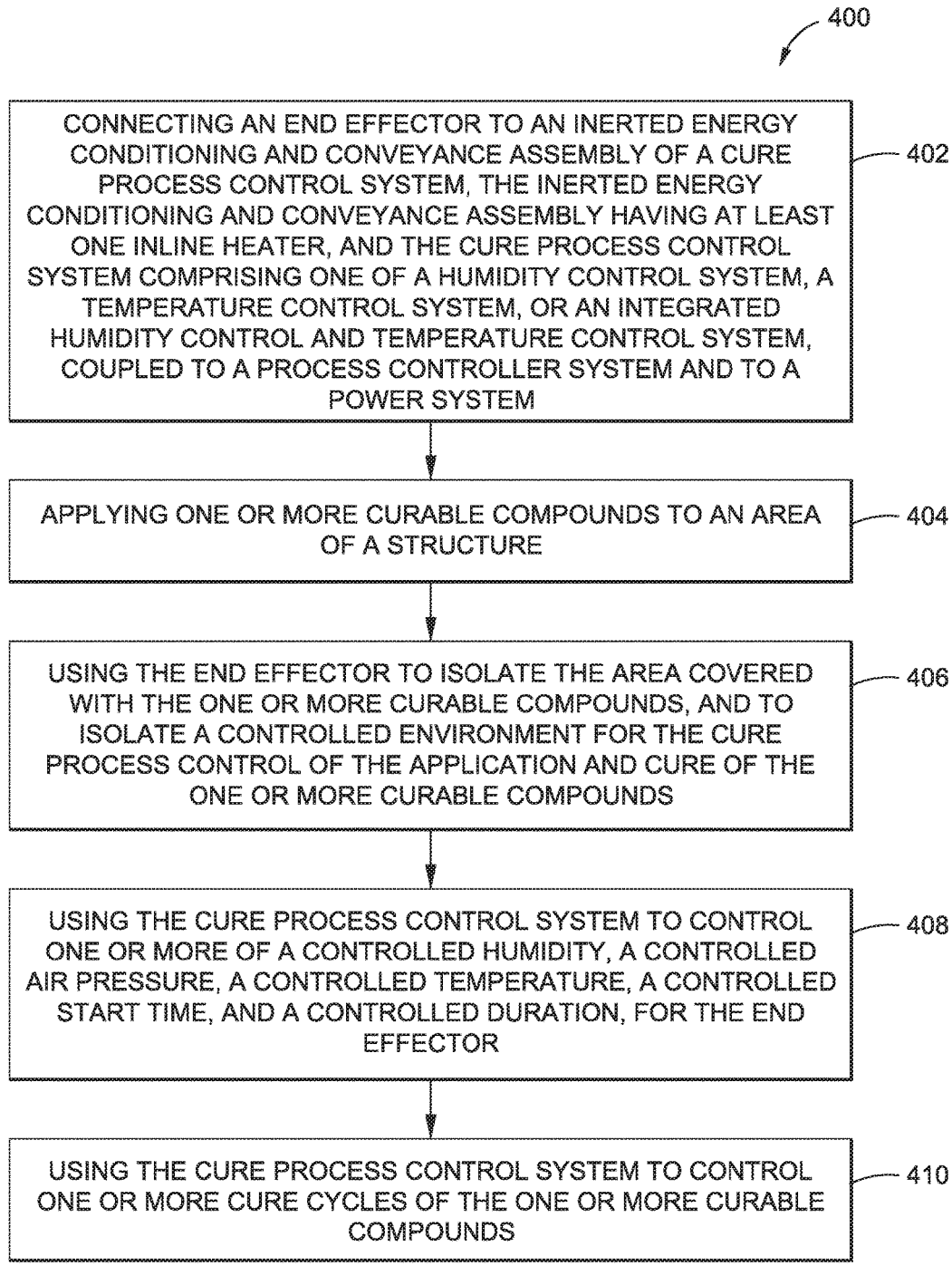
FIG. 14 is an illustration of a block flow diagram showing an exemplary embodiment of a method of the disclosure.

Now referring to FIG. 14, in another embodiment, there is provided a method 400 for isolating a controlled environment 74 (see FIG. 6) for cure process control 76 (see FIG. 6) of application and cure of one or more curable compounds 62 (see FIG. 6) to a structure 26 (see FIG. 6). FIG. 14 is an illustration of a block flow diagram showing an exemplary embodiment of the method 400 of the disclosure.

As shown in FIG. 14, the method 400 comprises step 402 of connecting an end effector 72 (see FIG. 4) to an inerted energy conditioning and conveyance assembly 230 (see FIG. 6) of a cure process control system 152 (see FIG. 6). The inerted energy conditioning and conveyance assembly 230 (see FIG. 6) has at least one inline heater 238 (see FIGS. 10A-10B). The cure process control system 152 (see FIG. 6) comprises one of a humidity control system 170 (see FIGS. 6, 7), a temperature control system 216 (see FIGS. 6, 8), or an integrated humidity control and temperature control system 228 (see FIGS. 6, 9), each coupled to a process controller system 156 (see FIG. 6) and to a power system 165 (see FIG. 6).

The step 402 (see FIG. 14) of connecting the end effector 72 (see FIG. 4) to the inerted energy conditioning and conveyance assembly 230 (see FIG. 6) may further comprise connecting the end effector 72 (see FIG. 4) to the inerted energy conditioning and conveyance assembly 230 (see FIG. 6) comprising a non-classified conditioning and conveyance assembly 230*a* (see FIGS. 6, 10A) in a non-classified environment 232 (see FIG. 6). The end effector 72 (see FIG. 4) is preferably connected to the inline heater 238 (see FIG. 10A) of the non-classified conditioning and conveyance assembly 230*a* (see FIG. 10A).

The step 402 (see FIG. 14) of connecting the end effector 72 (see FIG. 4) to the inerted energy conditioning and conveyance assembly 230 (see FIG. 6) may further comprise connecting the end effector 72 (see FIG. 4) to the inerted energy conditioning and conveyance assembly 230 (see FIG. 6) comprising a classified conditioning and conveyance assembly 230*b* (see FIGS. 6, 10B) in a classified environment 234 (see FIG. 6). The end effector 72 (see FIG. 4) is preferably connected to an insulated air line 246 (see FIG. 10B) of the classified conditioning and conveyance assembly 230*b* (see FIGS. 6, 10B), and the insulated air line 246 (see FIG. 10B) is connected to a heater thermocouple 242 (see FIG. 10B) connected to the at least one inline heater 238 (see FIG. 10B).

The step 402 (see FIG. 14) of connecting the end effector 72 (see FIG. 4) to the inerted energy conditioning and conveyance assembly 230 (see FIG. 6) may further comprise connecting the end effector 72 (see FIG. 4) comprising an involute conformal mold 78 (see FIG. 4). The involute conformal mold 78 (see FIG. 4) has a mold body 80 (see FIG. 4) comprising an exterior surface 90*a* (see FIG. 4) and an interior surface 90*b* (see FIG. 4). The interior surface 90*b* has a cavity profile 92 (see FIG. 4) corresponding to a desired curable compound shape 94 (see FIG. 4), and comprising a plurality of involute channels 100 (see FIG. 4) with spiral flow paths 102 (see FIG. 4).

The plurality of involute channels 100 (see FIG. 4) comprise one or more outer channels 114 (see FIG. 4). Each outer channel 114 (see FIG. 4) has an outer path profile 118 (see FIG. 4) configured for regenerative heat transfer 124 (see FIG. 4) to the one or more curable compounds 62 (see FIG. 6). The plurality of involute channels 100 (see FIG. 4) comprise one or more inner channels 130 (see FIG. 4). Each inner channel 130 (see FIG. 4) has an inner path profile 134 (see FIG. 4) configured for convective heat transfer 136 (see FIG. 4) and radiative heat transfer 144 (see FIG. 4) to the one or more curable compounds 62 (see FIG. 6).

The step of 402 of connecting the end effector 72 (see FIG. 4) to the inerted energy conditioning and conveyance assembly 230 (see FIG. 6) may further comprise adding one or more in-line components 264 (see FIG. 6) to the cure process control system 152 (see FIG. 6) to further condition the cure cycle 155 (see FIG. 6). The one or more in-line components 264 (see FIG. 6) preferably comprise one or more humidifiers 268 (see FIG. 6) for cure process control 76 (see FIG. 6) refinement, one or more mufflers 270 (see FIG. 6) for noise abatement during the cure cycle 155 (see FIG. 6), and one or more nozzles 272 (see FIG. 6) and one or more diffusers 273 (see FIG. 6) for adiabatic boosting of heat application during the cure cycle 155 (see FIG. 6).

The step 402 of connecting the end effector 72 (see FIG. 4) to the inerted energy conditioning and conveyance assembly 230 (see FIG. 6) of the cure process control system 152 (see FIG. 6) may include, as discussed above, connecting the insulated (compressed) air line 246 (see FIG. 10B) to the end effector 72 (see FIG. 4), if in a classified environment 234 (see FIG. 6), or alternatively, if in a non-classified environment 232 (see FIG. 6), connecting the inline heater 238 (see FIG. 10A) directly to the end effector 72 (see FIG. 4). The step 402 of connecting the end effector 72 (see FIG. 4) to the inerted energy conditioning and conveyance assembly 230 (see FIG. 6) of the cure process control system 152 (see FIG. 6) may further include connecting the inline heater 238 (see FIGS. 10A-10B, 11) to an air manifold 222 (see FIGS. 8, 9, 11), verifying the pressure setting on the air manifold 222 (see FIGS. 8, 9, 11) with pressure reading devices 278 (see FIG. 11), connecting the air manifold 222 (see FIGS. 8, 9) to shop air, such as air supply 176*a* (see FIG. 7) or air supply 176*b* (see FIGS. 8, 9). The cure process control system 152 (see FIGS. 6, 11) may then be powered and turned on, and the appropriate cure cycle 155 (see FIG. 6) may be initiated, for example, if using the automated isolated controlled environment (ICE) system 150*b* (see FIGS. 6, 11).

As shown in FIG. 14, the method 400 further comprises step 404 of applying the one or more curable compounds 62 (see FIG. 6) to the area 28 (see FIG. 6) of the structure 26 (see FIG. 6). Prior to applying the one or more curable compounds 62 (see FIG. 6), the one or more curable compounds 62 (see FIG. 6) may need to be defrosted if stored frozen. Prior to applying the one or more curable compounds 62 (see FIG. 6) to the area 28 (see FIG. 6) of the structure 26 (see FIG. 6), the application area 28 (see FIG. 6) may be cleaned or treated depending on the type and nature of the application area 28 (see FIG. 6) and the type and nature of each curable compound 62 (see FIG. 6). If the curable compound 62 (see FIG. 6) is applied to a substrate 138 (see FIGS. 4, 5C), the substrate may be wiped, cleaned, or treated with a solvent wipe or another suitable cleaning material. Once the area 28 (see FIG. 6) or substrate 138 (see FIG. 6) of the structure 26 (see FIG. 6) has been cleaned or treated, if needed, if molding is required or desired, a molding end effector 73*a* (see FIG. 4) may be installed onto the application area 28 (see FIG. 6). Prior to installing the molding end effector 73*a* (see FIG. 4), the molding end effector 73*a* (see FIG. 4) may be prepared and shaped or formed as needed. Alternatively, if no molding is required, a non-molding end effector 73*b* (see FIG. 4) may be used and installed on the area 28 (see FIG. 6) or substrate 138 (see FIG. 6) once they have been appropriately cleaned or treated.

If the molding end effector 73*a* (see FIGS. 4, 5A) is installed onto the application area 28 (see FIG. 6), the one or more curable compounds 62 (see FIG. 6) may be injected through the injection port 88*c* (see FIG. 5I) or other type of injection ports that may be formed in the molding end effector 73*a* (see FIGS. 4, 5I). The step 402 (see FIG. 14) of connecting the end effector 72 (see FIG. 4) to the inerted energy conditioning and conveyance assembly 230 (see FIG. 6) may further comprise connecting the end effector 72 (see FIG. 4) comprising a molding end effector 73*a* (see FIG. 4) to the inerted energy conditioning and conveyance assembly 230 (see FIG. 6), installing the molding end effector 73*a* (see FIG. 4) onto the area 28 (see FIG. 6) of the structure 26 (see FIG. 6) prior to applying the one or more curable compounds 62 (see FIG. 6), and injecting the one or more curable compounds 62 (see FIG. 6) into the molding end effector 73*a* (see FIGS. 4, 5I) through an injection port 88*c* (see FIGS. 4, 5I) of the molding end effector 73*a* (see FIGS. 4, 5I), thus resulting in application via injection fill of the one or more curable compounds 62 (see FIGS. 6, 5I) to the area 28 (see FIGS. 6, 5I) of the structure 26 (see FIGS. 6, 5I).

Thus, in one embodiment, the one or more curable compounds 62 (see FIG. 6) may be applied after installing the molding end effector 73a (see FIG. 4) onto the area 28 (see FIG. 6) of the structure 26 (see FIG. 6), by injecting the one or more curable compounds 62 (see FIG. 6) through the injection port 88c (see FIG. 5I), or another suitable port 88 (see FIG. 4) on the end effector 72 (see FIG. 4), and applying via injection fill the one or more curable compounds 62 (see FIG. 6) to the structure 26 (see FIG. 6), such as, for example, the substrate 138 (see FIG. 4). In another embodiment, if the injection port 88c (see FIG. 4) is not used, if there is no injection port 88c (see FIG. 4), or if the injection port 88c (see FIG. 4) is not a suitable application method, the one or more curable compounds 62 (see FIG. 6) may be applied directly to the structure 26 (see FIG. 6), such as, for example, the substrate 138 (see FIG. 4), before installing the molding end effector 73a (see FIG. 4) onto the area 28 (see FIG. 6) of the structure 26 (see FIG. 6), and then once the one or more curable compounds 62 (see FIG. 6) are applied, then installing the molding end effector 73a (see FIG. 4) onto the area 28 (see FIG. 6) of the structure 26 (see FIG. 6). In yet another embodiment, if the injection port 88c (see FIG. 4) is not used, if there is no injection port 88c (see FIG. 4), or if the injection port 88c (see FIG. 4) is not a suitable application method, the one or more curable compounds 62 (see FIG. 6) may be applied to the structure 26 (see FIG. 6) as a pre-pack application, that is, the one or more curable compounds 62 (see FIG. 6) may be applied in a pre-packaged amount or quantity into the end effector 72 (see FIG. 4), before installing the molding end effector 73a (see FIG. 4) onto the area 28 (see FIG. 6) of the structure 26 (see FIG. 6), and then once the pre-pack application of the one or more curable compounds 62 (see FIG. 6) is applied onto the area 28 (see FIG. 6) of the structure 26 (see FIG. 6) inside the end effector 72 (see FIG. 4), then installing the molding end effector 73a (see FIG. 4) onto the area 28 (see FIG. 6) of the structure 26 (see FIG. 6).

If the non-molding end effector 73b (see FIG. 4) is used in the system 150 (see FIG. 6), the curable compound(s) 62 (see FIG. 6) may be applied directly onto the area 28 (see FIG. 6) or the substrate 138 (see FIG. 6) and then the non-molding end effector 73b (see FIG. 4) may be installed over the area 28 (see FIG. 6). The non-molding end effector 73b (see FIG. 4) may comprise a shroud configuration 111 (see FIG. 6), such as an open-flow shroud 111a (see FIG. 6) or a box enclosure shroud 111b (see FIG. 6) to provide a shroud over the area 28 (see FIG. 6).

The step 402 (see FIG. 14 of connecting the end effector 72 (see FIG. 4) to the inerted energy conditioning and conveyance assembly 230 (see FIG. 6) may further comprise connecting the end effector 72 (see FIG. 4) comprising the non-molding end effector 73b (see FIG. 4) to the inerted energy conditioning and conveyance assembly 230 (see FIG. 6), applying the one or more curable compounds 62 (see FIG. 6) to the area 28 (see FIG. 6) of the structure 26 (see FIG. 6), and installing the non-molding end effector 73b (see FIG. 4) on the structure 26 (see FIG. 6) over the area 28 (see FIG. 6) covered with the one or more curable compounds 62 (see FIG. 6).

As shown in FIG. 14, the method 400 further comprises step 406 of using the end effector 72 (see FIGS. 4, 6) to isolate the area 28 (see FIG. 6) covered with the one or more curable compounds 62 (see FIG. 6), and to isolate the controlled environment 74 (see FIG. 6) for the cure process control 76 (see FIG. 6) of the application and cure of the one or more curable compounds 62 (see FIG. 6).

As shown in FIG. 14, the method 400 further comprises step 408 of using the cure process control system 152 (see FIG. 6) to control one or more of a controlled humidity 172 (see FIG. 6), a controlled air pressure 174 (see FIG. 6), a controlled temperature 218 (see FIG. 6), a controlled start time 260 (see FIG. 6), and a controlled duration 262 (see FIG. 6), for the end effector 72 (see FIGS. 4, 6). As shown in FIG. 14, the method 400 further comprises step 410 of using the cure process control system 152 (see FIG. 6) to control one or more cure cycles 155 (see FIG. 6) of the one or more curable compounds 62 (see FIG. 6).

The steps 408, 410 (see FIG. 14) of using the cure process control system 152 (see FIG. 6) may further comprise before and during the one or more cure cycles 155 (see FIG. 6) of the one or more curable compounds 62 (see FIG. 6), applying temperature control with a desired temperature, applying humidity control with a desired humidity, and/or applying air pressure control with a desired air pressure, at the end effector 72 (see FIG. 4) to the one or more curable compounds 62 (see FIG. 6) covering or applied to the area 28 (see FIG. 6) or substrate 138 (see FIG. 6), either automatically or manually, with the cure process control system 152 (see FIG. 6).

The steps 408, 410 (see FIG. 14) of using the cure process control system 152 (see FIG. 6) may further comprise remotely generating heated air and transporting the conditioned air 108 (see FIG. 4), such as in the form of heated air 109 (see FIG. 4) through the insulated (compressed) air line 246 (see FIG. 10B) into a regeneration system 122 (see FIG. 4) or heat transfer device in the end effector 72 (see FIG. 4).

The steps 408, 410 (see FIG. 14) of using the cure process control system 152 (see FIG. 6) may further comprise drying, filtering, and pressure regulating incoming air; pre-heating and humidifying the air prior to re-drying and re-filtering the air; and then transporting the air to the end effector 72 (see FIG. 4), and may further comprise sensing parameters of the air and the one or more curable compounds 62 (see FIG. 6), while shrouded by the end effector 72 (see FIG. 4), and transmitting the sensed parameters to a process controller 158 (see FIG. 6) coupled to the end effector 72 (see FIG. 4).

In addition to one curable compound 62 (see FIG. 6) being applied and cured during a cure cycle 155 (see FIG. 6), multiple curable compounds 62 (see FIG. 6) may be applied and cured simultaneously during one cure cycle 155 (see FIG. 6) or more than one cure cycles 155 (see FIG. 6). For example, curable compounds 62 (see FIG. 6) that are sufficiently close in proximity and have sufficiently similar cure profiles may be cured under a single box-enclosure shroud 111b (see FIG. 5L), or discrete curable compounds 62 (see FIG. 6) in various locations with separate ideal conditions may be cured by separate end effectors 72 (see FIG. 4) from the same system 150 (see FIG. 6). For example, an exemplary embodiment disclosed herein may have the capability to control four (4) end effectors 72 (see FIG. 4) simultaneously, each with different cure cycle characteristics (start time, duration, ideal temperature profile, etc.). A cure cycle 155 (see FIG. 6) may cure one or more of the curable compounds 62 (see FIG. 6) at the same time.

Following completion of the cure cycle 155 (see FIG. 6), the system 150 (see FIG. 6), such as the automated ICE system 150b (see FIGS. 6, 11) may be turned off and disassembled. The cure process control system 152 (see FIGS. 6, 11) and the air supply 176a (see FIG. 7) or air supply 176b (see FIGS. 8, 9) may be de-energized and turned off. The inline heater 238 (see FIGS. 10A, 10B) and/or the insulated air line 246 (see FIG. 10B), and the shroud if the non-molding end effector 73b (see FIG. 4) is used, may be disconnected and stowed. If the molding end effector 73a (see FIG. 4) is used, the molding end effector 73a (see FIG. 4) may be disassembled, cleaned and/or solvent wiped, and stowed. The area 28 (see FIG. 6) or substrate 138 (see FIG. 6) that have been cured with the system 150 (see FIG. 6) and method 400 (see FIG. 14) may be prepared for inspection.

Disclosed embodiments of the apparatus 70 (see FIG. 4), the system 150 (see FIG. 6), and the method 400 (see FIG. 14) for isolating a controlled environment 74 (see FIG. 6) for cure process control 76 (see FIG. 6) of application and cure of one or more curable compounds 62 (see FIG. 6) to a structure 26 (see FIG. 6) provide cure process control 76 (see FIG. 6) and in-situ process control 154 (see FIG. 6) in the controlled environment 74 (see FIG. 6) through remote generation of heat by the process controller system 156 (see FIG. 6) external to the controlled environment 74 (see FIG. 6).

In addition, disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of the application and cure of one or more curable compounds 62 (see FIG. 6) to the structure 26 (see FIG. 6) provide a controlled temperature 218 (see FIG. 6) that allows for a desired temperature at the end effector 72 (see FIG. 4) to be "dialed in" or automatically controlled according to programmed values; provide a controlled humidity 172 (see FIG. 6) that allows for a desired humidity at the end effector 72 (see FIG. 4) to be "dialed in" or automatically controlled according to programmed values; provide a controlled air pressure 174 that allows for desired air pressure at the end effector 72 (see FIG. 4) to be "dialed in" or automatically controlled according to programmed values; and provide a pneumatic medium/convective process that utilizes standard pneumatic connections for conditioning of shop air to provide environmental controls, and uses convective heat transfer 136 (see FIG. 4) as a primary method of environmental control in most processes.

Moreover, disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of application and cure of one or more curable compounds 62 (see FIG. 6) to the structure 26 (see FIG. 6) provide quality assurance and data logging by tracking and storing stored performance data 364 (see FIG. 6) through a data logging feature 362 (see FIG. 6), where the stored performance data 364 (see FIG. 6) may be used as part of a quality assurance plan for ensuring full conformity of the curable compounds 62 (see FIG. 6) to specifications prior to post-processing; provide a field transportable system that is capable of being mounted on a portable cart 169a (see FIG. 11) and transported to field applications as needed, and that is easily adapted for use with a field transportable generator and compressor for under-improved field operations; provide a system capable of major changes to the configuration while continuing normal operation, robusticized against interruptions to power and air supplies and capable of switching between types of curable compounds 62 (see FIG. 6) and end effector 72 (see FIG. 4) configurations through standard couplings 358 (see FIG. 6), such as standard pneumatic fittings, or quick disconnect fittings 360 (see FIG. 6); and provide simultaneous cure process control 76 (see FIG. 6) with a single system that may independently control multiple curable compounds 62 (see FIG. 6) simultaneously, and where temperature, humidity, pressure, start time, and duration may be independently controlled for each end effector 72 (see FIG. 2).

In addition, disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of application and cure of one or more curable compounds 62 (see FIG. 6) to the structure 26 (see FIG. 6) provide a system that employs various safe-guards, such as an alarm 164 (see FIG. 11) to ensure hazardous energy fail-safes and to isolate an operator or others from any potential hazards associated with the cure process control 76 (see FIG. 6).

Disclosed embodiments of the apparatus 70 (see FIG. 4), the system 150 (see FIG. 6), and the method 400 (see FIG. 14) further provide a class one, division one compliant system that effectively meets the standards set forth for use of electrical equipment in hazardous areas by NFPA 70 (i.e., the National Electrical Code (NEC), which is a regionally adoptable standard for the safe installation of electrical wiring and equipment in the United States, and is part of the National Fire Codes series published by the National Fire Protection Association (NFPA), a private trade association), and this allows the continuity of normal operations during the duration of cure process control 76 (see FIG. 6); and provide a system that effectively integrates to a production environment with minimal change in level of risk to the occupational health and safety of nearby workers, for example, in a work environment, the system 150 (see FIG. 6) does not materially interfere with the control of environments designed for human occupancy even when operated for full cure cycles 155 (see FIG. 6) within those environments, may not materially increase background noise, nor produce any noise above a threshold requiring active or passive countermeasures, and may not materially impact ergonomics of nearby operations. The system 150 (see FIG. 6) and method 400 (see FIG. 14) provide an in-situ process control 154 (see FIG. 6) of application and cure of curable compound(s) 62 (see FIG. 6) and the application system is able to operate within classified environments 234 (see FIG. 6), for example, fuel tanks of aircraft 10a (see FIG. 1).

Further, disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of application and cure of one or more curable compounds 62 (see FIG. 6) to the structure 26 (see FIG. 6) provide a system that has zero or minimal emissions or physical waste to the surrounding environment during operations; provide a system 150 (see FIG. 6) that leverages PLC (programmable logic controller) controls 160 (see FIG. 6) for processing, allowing for simple re-programming, when switching between various types of curable compounds 62 (see FIG. 6) and environmental requirements on single system; provide an automated isolated controlled environment (ICE) system 150b (see FIG. 11) capable of sustained cure process control 76 (see FIG. 6) with minimal operator oversight, and fully controlled cure cycles 155 (see FIG. 6) may be sustained without an operator once initiated; and provide for remote actuation, and once one or more end effectors 72 (see FIG. 4) have been installed, the system 150 (see FIG. 6) may be fully operated remotely, outside of the controlled environment 74 (see FIG. 6), and an operator may be isolated from any hazards associated with the cure process control 76 (see FIG. 6).

In addition, disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of application and cure of one or more curable compounds 62 (see FIG. 6) to the structure 26 (see FIG. 6) provide a system that uses primarily electric power 166a (see FIG. 6) as a power source 166 (see FIG. 6) and source of energy for the cure process control 76 (see FIG. 6), and may use a single plug to a standard 30 Amp (Amperage) socket to facilitate lock-out and tag-out operations; provide a field portable, flexible, adaptable, and low profile apparatus 70 (see FIG. 4), system 150 (see FIG. 6), and method 400 (see FIG. 14) that operates nearly independent of external environmental conditions; and provide a system 150 (see FIG. 6) and method 400 (see FIG. 14) that may result in faster production time, reduced labor costs for production, improved product quality which may result in no or minimal product rework, and reduced product flow time.

In addition, disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of application and cure of one or more curable compounds 62 (see FIG. 6) to the structure 26 (see FIG. 6) has the capability to adapt to hazardous and inaccessible areas and may preferably be used with processes that may require a controlled rate of heat or humidity addition and dissipation. Further, the disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of application and cure of one or more curable compounds 62 (see FIG. 6) to the structure 26 (see FIG. 6) may be used in high speed machining processes and plastics forming process control.

The system may be considered a full environmental control suite with capabilities to adapt to hazardous and inaccessible areas. Any process that may require a controlled rate of heat or humidity addition and dissipation is a potential application for the system.

Finally, disclosed embodiments of the apparatus 70 (see FIG. 4), the system 150 (see FIG. 6), and the method 400 (see FIG. 14) for isolating the controlled environment 74 (see FIG. 6) for cure process control 76 (see FIG. 6) of application and cure of one or more curable compounds 62 (see FIG. 6) to the structure 26 (see FIG. 6) provide quick-disconnect interchangeable end effectors 75 (see FIG. 4) for customized use in a variety of applications with no or minimal constraint on or modification to the underlying system architecture. The system 150 (see FIG. 6) uses physical end effectors 72 (see FIG. 4) independent of the cure process control 76 (see FIG. 6). The end effectors 72 (see FIG. 4) preferably operate with the system 150 (see FIG. 6) and may leverage any combination of the following characteristics: (a) protective, the end effector 72 (see FIG. 4) envelops the one or more curable compounds 62 (see FIG. 6) to protect against damage, unwanted contact, and foreign object debris intrusion, (b) conformal, the end effector 72 (see FIG. 4) may conform to complex geometric shapes 98 (see FIG. 4), while providing for uniform delivery of a conditioned environment, (c) molding, the end effector 72 (see FIG. 4) may be used in dual purpose as part molds 96 (see FIG. 4) for curable compounds 62 (see FIG. 6) with prescribed shapes, and the curable compound 62 (see FIG. 6) injection, the forming, and the controlled curing may be managed with single part, (d) regenerative, the end effector 72 (see FIG. 6), such as in the form of the involute conformal mold 78 (see FIG. 4), may utilize a convoluted path to take advantage of regenerative heat transfer 124 (see FIG. 4) for increased efficiency 128 (see FIG. 4), and spiral flow paths 102 (see FIG. 4) provide a pre-heated shroud 110a (see FIG. 4) of exhaust air 112 (see FIG. 4) over incoming conditioned air 108 (see FIG. 4) to limit transmission of waste heat into surrounding environment, which may be controlled or classified itself.

For more highly controlled applications, the end effector 72 (see FIG. 4) may utilize convective heat transfer 136 (see FIG. 4) or radiative heat transfer 144 (see FIG. 4) to the curable compound 62 (see FIG. 6) to isolate the controlled environment 74 (see FIG. 6) and the cure cycle 155 (see FIG. 6) from external air. Inerted energy 106 (see FIG. 4) is preferably transported through an insulated air line 246 (see FIG. 10B) that is compressed and that terminates at an interchangeable standard quick disconnect fitting 360 (see FIG. 6) to provide for configuration management. The involute conformal mold 78 (see FIG. 4) that is interchangeable is preferably utilized as the end effector 72 (see FIG. 4) in both the application of the curable compound 62 (see FIG. 6) and the cure cycle 155 (see FIG. 6) of the curable compound 62 (see FIG. 6).

EXAMPLE

The automated isolated controlled environment (ICE) system 150b shown in FIG. 11 was used in the application of a curable compound 62 (see FIG. 6), in the form of a wet sealant 64 (see FIG. 6), to an aircraft center wing tank 275 (see FIG. 6) accessed through an access panel 274 (see FIG. 11) on an air vehicle 10 (see FIG. 11) in the form of an aircraft 10a (see FIG. 1). The following steps were taken in using the automated isolated controlled environment (ICE) system 150b (see FIG. 11):

1. The appropriate protective equipment (PRE), in the form of a box enclosure shroud non-molding end effector was placed over an area to be heated inside the aircraft center wing tank.

2. The insulated air line hose was removed from the portable cart, was inserted through the access panel of the aircraft wing and inserted into the aircraft center wing tank, and the female end of the insulated air line hose was connected to the PRE, while pulling back the cover of the access panel. The remaining insulated air line hose was dropped out of the access panel in the wing.

3. An inline heater was connected to the insulated air line hose at the female fitting.

4. The heater power line was connected to the other end of the inline heater.

5. Steps 1-4 were repeated for the remaining required heaters.

6. The first inline heater was plugged into the process controller on the portable cart.

a. A Process Thermocouple" was plugged into a right-hand thermocouple receptacle labeled "HEATER 1".

b. A "High Limit Thermocouple" was plugged into a left-hand thermocouple receptacle.

c. The heater power line for the first inline heater was plugged in.

7. A hose for the shop air supply attached to the manifold behind the process controller was connected to the shop air supply.

8. The shop air supply was turned on.

9. A pressure reading between 25 psi to 27 psi was verified for all the inline heaters that were plugged in.

10. a. The appropriate 120V 30 Amp outlet was located.

b. The power cord located on the LEFT side of the process controller was plugged into the 120V 30 Amp outlet and was twisted to lock in a receptacle.

11. The automated isolated controlled environment (ICE) system was turned on by pushing the "ON" button on the front of the process controller.

12. An "Automatic Mode" indication appeared on the touch screen control panel of the process controller and the "Automatic Mode" indication was selected.

13. A "Start" indication appeared on the touch screen control panel and was selected for the corresponding heater (s), and a warning was indicated on the touch screen control panel that read: WARNING: Air must be turned on while heaters are running.

14. a. At the end of the cure cycle, the heaters started cooling down to avoid hot surfaces on contact.

b. At the end of the cooling cycle, "CYCLE COMPLETE" appeared on the touch screen control panel. The PRE was indexed to the next available area with wet sealant. Step 13 was repeated.

15. At the end of the "CYCLE COMPLETE", an alarm sounded for 10 seconds and then stopped.

16. The "OFF" button on the front of the process controller was pressed to shut down and turn off the automated isolated controlled environment (ICE) system.

17. The main air supply was turned off.

18. The PREs, inline heaters, and air supply hoses were disconnected.

19. The parts of the automated isolated controlled environment (ICE) system were returned to their appropriate location on the portable cart, and the portable cart was stored in a safe and secure place.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An apparatus for isolating a controlled environment for cure process control of application and cure of one or more curable compounds to a structure, the apparatus comprising:

an end effector comprising an involute conformal mold having a mold body shaped to provide a shroud over an area covered with the one or more curable compounds on the structure, to isolate the area and to isolate the controlled environment for cure process control of the application and cure of the one or more curable compounds, the mold body comprising:

an exterior surface and an interior surface, the interior surface having a cavity profile corresponding to a desired curable compound shape;

one or more ports formed in the exterior surface of the mold body; and a plurality of involute channels with spiral flow paths, the plurality of involute channels comprising:

one or more outer channels, each outer channel having an outer path profile configured for regenerative heat transfer to the one or more curable compounds; and one or more inner channels, each inner channel having an inner path profile configured for convective heat transfer and radiative heat transfer to the one or more curable compounds.

2. The apparatus of claim 1 wherein the mold body comprises one of a one-piece mold configuration, or a two-piece mold configuration with a split plane configuration.

3. The apparatus of claim 1 wherein the one or more ports are configured for one or more of, input of the one or more curable compounds into the end effector, input of conditioned air into the end effector, and minimized output of exhaust air out of the end effector.

4. The apparatus of claim 1 wherein the one or more outer channels have one or more cross-flow paths relative to the one or more inner channels, to facilitate the regenerative heat transfer.

5. The apparatus of claim 1 wherein each inner channel has an oblong cross section with a surface that facilitates the convective heat transfer, and further wherein each inner channel has an elongated outer surface that provides a radiative view factor.

6. The apparatus of claim 1 wherein the plurality of involute channels are configured to transfer inerted energy to the one or more curable compounds from conditioned air that is input into the end effector.

7. The apparatus of claim 1 wherein the involute conformal mold is configured to conform in-situ to one or more geometric shapes of the area of the structure, while providing a uniform cure profile.

8. A system for isolating a controlled environment for cure process control of application and cure of one or more curable compounds to a structure, the system comprising:

a cure process control system comprising:

a power system;

a process controller system coupled to the power system;

one of a humidity control system, a temperature control system, or an integrated humidity control and temperature control system, coupled to the process controller system and the power system; and an inerted energy conditioning and conveyance assembly having a first end and a second end, the first end coupled via a connector element to one of the humidity control system, the temperature control system, or the integrated humidity control and temperature control system; and one or more end effectors, each end effector configured for independent coupling to the second end of the inerted energy conditioning and conveyance assembly, and each end effector shaped to provide a shroud over an area covered with the one or more curable compounds on the structure, to isolate the area and to isolate the controlled environment for cure process control of the application and cure of the one or more curable compounds, and wherein the one or more end effectors comprise one or more involute conformal molds, each involute conformal mold having a mold body comprising an interior surface with a cavity profile corresponding to a desired curable compound shape and each mold comprises a plurality of involute channels with spiral flow paths, the plurality of involute channels comprising:

one or more outer channels, each outer channel having an outer profile configured for regenerative heat transfer to the one or more curable compounds by transferring waste heat to a regeneration system which recovers the transferred waste heat for use in the mold; and one or more inner channels, each inner channel having an inner path profile configured for convective heat transfer and radiative heat transfer to the one or more curable compounds.

9. The system of claim 8 wherein the cure process control system further comprises one or more in-line components comprising one or more humidifiers for cure process control refinement, one or more mufflers for noise abatement during one or more cure cycles of the one or more curable compounds, and one or more nozzles and one or more diffusers for adiabatic boosting of heat application during the one or more cure cycles.

10. The system of claim 8 wherein the inerted energy conditioning and conveyance assembly comprises a non-classified conditioning and conveyance assembly configured for use in a non-classified environment, the one or more end effectors connected to at least one inline heater of the non-classified conditioning and conveyance assembly.

11. The system of claim 8 wherein the inerted energy conditioning and conveyance assembly comprises a classified conditioning and conveyance assembly configured for use in a classified environment, the one or more end effectors connected to an insulated air line of the classified conditioning and conveyance assembly, the insulated air line connected to at least one inline heater of the classified conditioning and conveyance assembly, the insulated air line comprising a central opening and a plurality of concentric layers around the central opening.

12. The system of claim 8 wherein the cure process control system independently controls one or more of a controlled humidity, a controlled air pressure, a controlled temperature, a controlled start time, and a controlled duration for each of the one or more end effectors, and further wherein the cure process control system independently controls one or more cure cycles of the one or more curable compounds simultaneously.

13. The system of claim 8 wherein the structure comprises an aircraft structural part, and further wherein the system is portable and comprises a portable cart configured to transport the system to an aircraft for in-situ process control of application of the one or more curable compounds to the area of the structure.

14. A method for isolating a controlled environment for cure process control of application and cure of one or more curable compounds to a structure, the method comprising the steps of:
connecting an end effector to an inerted energy conditioning and conveyance assembly of a cure process control system, the inerted energy conditioning and conveyance assembly having at least one inline heater, and the cure process control system comprising one of a humidity control system, a temperature control system, or an integrated humidity control and temperature control system, coupled to a process controller system and to a power system, the end effector comprising an involute conformal mold having a mold body shaped to provide a shroud over an area covered with the one or more curable compounds on the structure, the mold body comprising:
an exterior surface and an interior surface, the interior surface having a cavity profile corresponding to a desired curable compound shape;
one or more ports formed in the exterior surface of the mold body; and
a plurality of involute channels with spiral flow paths, the plurality of involute channels comprising:
one or more outer channels, each outer channel having an outer path profile configured for regenerative heat transfer to the one or more curable compounds; and
one or more inner channels, each inner channel having an inner path profile configured for convective heat transfer and radiative heat transfer to the one or more curable compounds;
applying the one or more curable compounds to an area of the structure;
using the end effector to isolate the area covered with the one or more curable compounds, and to isolate the controlled environment for the cure process control of the application and cure of the one or more curable compounds;
using the cure process control system to control one or more of a controlled humidity, a controlled air pressure, a controlled temperature, a controlled start time, and a controlled duration, for the end effector; and
using the cure process control system to control one or more cure cycles of the one or more curable compounds.

15. The method of claim 14 wherein connecting the end effector to the inerted energy conditioning and conveyance assembly further comprises connecting the end effector to the inerted energy conditioning and conveyance assembly comprising a non-classified conditioning and conveyance assembly in a non-classified environment, the end effector connected to at least one inline heater of the non-classified conditioning and conveyance assembly.

16. The method of claim 14 wherein connecting the end effector to the inerted energy conditioning and conveyance assembly further comprises connecting the end effector to the inerted energy conditioning and conveyance assembly comprising a classified conditioning and conveyance assembly in a classified environment, the end effector connected to an insulated air line of the classified conditioning and conveyance assembly, the insulated air line connected to at least one inline heater of the classified conditioning and conveyance assembly.

17. The method of claim 14 wherein connecting the end effector to the inerted energy conditioning and conveyance assembly further comprises connecting the end effector comprising a molding end effector to the inerted energy conditioning and conveyance assembly, installing the molding end effector onto the area of the structure prior to applying the one or more curable compounds, and injecting the one or more curable compounds into the molding end effector through an injection port of the molding end effector.

18. The method of claim 14 wherein connecting the end effector to the inerted energy conditioning and conveyance assembly further comprises connecting the end effector comprising a non-molding end effector to the inerted energy conditioning and conveyance assembly, applying the one or more curable compounds to the area of the structure, and installing the non-molding end effector on the structure over the area covered with the one or more curable compounds.

19. The method of claim 14 wherein connecting the end effector to the inerted energy conditioning and conveyance assembly further comprises connecting the end effector comprising the involute conformal mold being configured to conform in-situ to one or more geometric shapes of the area of the structure, while providing a uniform cure profile.

20. The method of claim 14 wherein connecting the end effector to the inerted energy conditioning and conveyance assembly further comprises adding one or more in-line components to the cure process control system to further condition the one or more cure cycles, the one or more in-line components comprising one or more humidifiers for cure process control refinement, one or more mufflers for noise abatement during the one or more cure cycles, and one or more nozzles and one or more diffusers for adiabatic boosting of heat application during the one or more cure cycles.

* * * * *